(12) United States Patent
Wang et al.

(10) Patent No.: US 9,990,206 B2
(45) Date of Patent: *Jun. 5, 2018

(54) MECHANISM FOR INSTRUCTION SET BASED THREAD EXECUTION OF A PLURALITY OF INSTRUCTION SEQUENCERS

(71) Applicant: Intel Corporation, Santa Clara, CA (US)

(72) Inventors: Hong Wang, Sanfta Clara, CA (US); John Shen, San Jose, CA (US); Edward Grochowski, San Jose, CA (US); Richard Hankins, Santa Clara, CA (US); Gautham Chinya, Hillsboro, OR (US); Bryant Bigbee, Scottsdale, AZ (US); Shivnandan Kaushik, Portland, OR (US); Xiang Chris Zou, Hillsboro, OR (US); Per Hammarlund, Hillsboro, OR (US); Scott Dion Rodgers, Hillsboro, OR (US); Xinmin Tian, Union City, CA (US); Anil Aggawal, Portland, OR (US); Prashant Sethi, Folsom, CA (US); Baiju Patel, Portland, OR (US); James Held, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 77 days.

This patent is subject to a terminal disclaimer.

(21) Appl. No.: 13/843,164

(22) Filed: Mar. 15, 2013

(65) Prior Publication Data

US 2013/0219399 A1 Aug. 22, 2013

Related U.S. Application Data

(63) Continuation of application No. 13/608,970, filed on Sep. 10, 2012, which is a continuation of application
(Continued)

(51) Int. Cl.
*G06F 9/46* (2006.01)
*G06F 9/38* (2018.01)
(Continued)

(52) U.S. Cl.
CPC ........ *G06F 9/3867* (2013.01); *G06F 9/30003* (2013.01); *G06F 9/3005* (2013.01);
(Continued)

(58) Field of Classification Search
CPC ............. G06F 9/30003; G06F 9/30043; G06F 9/3005; G06F 9/3009; G06F 9/3017;
(Continued)

(56) References Cited

U.S. PATENT DOCUMENTS 5,930,504 A 7/1999 Gabel
6,105,105 A 8/2000 Trimberger
(Continued)

FOREIGN PATENT DOCUMENTS

JP 2000-207202 A 7/2000
JP 2002-73331 A 3/2002

OTHER PUBLICATIONS

Tu et al., "SMTA: Next-Generation High-Performance Multi-Threaded Processor", IEE Proceedings E. Computers & Digital Techniques, Institution of Electrial Engineers. Stevenage, GB, vol. 149, No. 5, Sep. 27, 2002, pp. 213-218, CP 006018769, ISSN: 0143-7062.*
(Continued)

*Primary Examiner* — Meng An
*Assistant Examiner* — Willy W Huaracha
(74) *Attorney, Agent, or Firm* — Nicholson De Vos Webster & Elliott LLP

(57) ABSTRACT

In an embodiment, a method is provided. The method includes managing user-level threads on a first instruction sequencer in response to executing user-level instructions on
(Continued)

a second instruction sequencer that is under control of an application level program. A first user-level thread is run on the second instruction sequencer and contains one or more user level instructions. A first user level instruction has at least 1) a field that makes reference to one or more instruction sequencers or 2) implicitly references with a pointer to code that specifically addresses one or more instruction sequencers when the code is executed.

18 Claims, 16 Drawing Sheets

Related U.S. Application Data

No. 11/173,326, filed on Jun. 30, 2005, now Pat. No. 8,719,819.

(51) Int. Cl.
*G06F 9/30* (2018.01)
*G06F 9/48* (2006.01)

(52) U.S. Cl.
CPC .......... *G06F 9/3009* (2013.01); *G06F 9/3017* (2013.01); *G06F 9/30043* (2013.01); *G06F 9/30145* (2013.01); *G06F 9/30174* (2013.01); *G06F 9/3851* (2013.01); *G06F 9/4843* (2013.01); *G06F 9/4881* (2013.01)

(58) Field of Classification Search
CPC .. G06F 9/30174; G06F 9/3851; G06F 9/4843; G06F 9/4881; G06F 9/30145; G06F 9/3867
USPC ................................. 718/100, 108; 712/205
See application file for complete search history.

(56) References Cited

U.S. PATENT DOCUMENTS

| | | | |
|---|---|---|---|
| 6,105,127 A | 8/2000 | Kimura et al. | |
| 6,301,650 B1 | 10/2001 | Satou | |
| 6,389,446 B1* | 5/2002 | Torii | 718/100 |
| 6,549,930 B1 | 4/2003 | Chrysos et al. | |
| 6,574,725 B1 | 6/2003 | Kranich et al. | |
| 6,651,163 B1* | 11/2003 | Kranich et al. | 712/244 |
| 6,668,308 B2* | 12/2003 | Barroso | G06F 12/0826 365/230.03 |
| 7,024,671 B2* | 4/2006 | Yamashita | G06F 9/4862 718/102 |
| 7,093,147 B2* | 8/2006 | Farkas | G06F 1/3203 713/320 |
| 7,401,206 B2 | 7/2008 | Hetherington | |
| 7,418,585 B2 | 8/2008 | Kissell | |
| 7,437,581 B2* | 10/2008 | Grochowski | G06F 1/206 712/E9.053 |
| 7,676,655 B2 | 3/2010 | Jordan | |
| 7,735,088 B1 | 6/2010 | Klausler | |
| 7,996,839 B2* | 8/2011 | Farkas | G06F 9/5088 702/182 |
| 8,443,377 B2* | 5/2013 | Inoue et al. | 719/313 |
| 8,479,217 B2* | 7/2013 | Chinya et al. | 718/108 |
| 2002/0029330 A1* | 3/2002 | Kamano et al. | 712/34 |
| 2002/0199179 A1 | 12/2002 | Lavery et al. | |
| 2003/0088610 A1 | 5/2003 | Kohn et al. | |
| 2003/0174354 A1 | 9/2003 | Oteki | |
| 2004/0154011 A1 | 8/2004 | Wang et al. | |
| 2004/0163083 A1 | 8/2004 | Wang et al. | |
| 2004/0215932 A1 | 10/2004 | Burky et al. | |
| 2004/0215987 A1 | 10/2004 | Farkas et al. | |
| 2004/0216120 A1 | 10/2004 | Burky et al. | |
| 2005/0223199 A1* | 10/2005 | Grochowski et al. | 712/235 |
| 2005/0229184 A1 | 10/2005 | Inoue et al. | |
| 2005/0240925 A1* | 10/2005 | Ault | G06F 9/5044 718/100 |
| 2006/0075404 A1* | 4/2006 | Rosu et al. | 718/100 |
| 2006/0095908 A1* | 5/2006 | Norton | G06F 9/4881 718/100 |
| 2006/0155973 A1 | 7/2006 | Soltis, Jr. | |
| 2006/0161762 A1* | 7/2006 | Eisen | G06F 9/3844 712/233 |
| 2006/0271932 A1 | 11/2006 | Chinya et al. | |
| 2007/0074217 A1 | 3/2007 | Rakvic et al. | |
| 2007/0079301 A1 | 4/2007 | Chinya et al. | |

OTHER PUBLICATIONS

Final Office Action for U.S. Appl. No. 13/608,970, dated Jun. 16, 2016, 15 pages.
Kumar et al., "Heterogeneous chip multiprocessors", IEEE Computer (vol. 38, Issue 11), Nov. 2005, pp. 32-38.
Final Office Action for U.S. Appl. No. 14/866,875, dated Jun. 30, 2016, 21 pages.
Anderson et al., "Scheduler Activations: Effective Kernel Support for the User-Level Management of Parallelism", ACM Transactions on Computer Systems, vol. 10, No. 1, Feb. 1992, pp. 53-79.
Kumar et al., "Single-ISA Heterogeneous Multi-core Architectures for Multithreaded Workload Peformance", Computer Architecture, 2004 Proceedings, 31 Annual International Symposium on Muchen, Germany, Jun. 19-23, 2004, IEEE, pp. 64-75.
International Search Report for PCT/US2005/047328, dated Mar. 8, 2006, 7 pages.
Written Opinion of the International Searching Authority for PCT/US2005/047328, dated Mar. 8, 2006, 9 pages.
First Office Action from foreign counterpart China Patent Application No. 200580044896.2, dated Dec. 12, 2008, 17 pages.
Second Office Action from foreign counterpart China Patent Application No. 200580044896.2, dated May 6, 2010, 8 pages.
Third Office Action from foreign counterpart China Patent Application No. 200580044896.2, dated Nov. 18, 2010, 8 pages.
Notification to Grant Patent Right for Invention from foreign counterpart China Patent Application No. 200580044896.2, dated May 26, 2011, 4 pages.
International Preliminary Report on Patentability for International Application No. PCT/US2005/047328, dated Jul. 3, 2007, 11 pages.
Office Action from foreign counterpart German Patent Application No. 11 2005 003 343.0-53, dated Oct. 30, 2008, 4 pages.
Office Action from foreign counterpart German Patent Application No. 11 2005 003 343.0-53, dated May 28, 2009, 8 pages.
Tyson, G. et al., "Misc: A Multiple Instruction Stream Computer", Proceedings of the 25th Annual International Symposium of Microarchitecture, IEEE, 1992, 5 pages.
Summons to Attend Oral Proceedings from foreign counterpart German Patent Application No. 11 2005 003 343.0-53, dated Feb. 8, 2010, 5 pages.
Issued Patent from foreign counterpart German Patent Application No. 11 2005 003 343.0-53, dated May 19, 2011, 5 pages.
Office Action from foreign counterpart Japan Patent Application No. 2007-549602, dated Jun. 15, 2010, 5 pages.
Office Action from foreign counterpart Japan Patent Application No. 2007-549602, dated Oct. 26, 2010, 4 pages.
Office Action from foreign counterpart Japan Patent Application No. 2007-549602, dated Feb. 7, 2012, 10 pages.
Final Office Action from foreign counterpart Japan Patent Application No. 2007-549602, dated Sep. 18, 2012, 7 pages.
Certificate of Patent from foreign counterpart Japan Patent Application No. 2007-549602, dated May 2, 2013, 5 pages.
Office Action from foreign counterpart Japan Patent Application No. 2010-204922, dated Jul. 17, 2012, 5 pages.
Certificate of Patent from foreign counterpart Japan Patent Application No. 2010-204922, dated Apr. 12, 2013, 5 pages.
Office Action from U.S. Appl. No. 11/173,326, dated Nov. 3, 2009, 18 pages.
Final Office Action from U.S. Appl. No. 11/173,326, dated Apr. 26, 2010, 15 pages.

(56) References Cited

OTHER PUBLICATIONS

Office Action from U.S. Appl. No. 11/173,326, dated Feb. 16, 2011, 16 pages.
Final Office Action from U.S. Appl. No. 11/173,326, dated Oct. 12, 2011, 16 pages.
Final Office Action from U.S. Appl. No. 11/173,326, dated May 13, 2013, 17 pages.
Notice of Allowance from U.S. Appl. No. 11/173,326, dated Dec. 17, 2013, 10 pages.
Office Action from U.S. Appl. No. 13/608,970, dated Sep. 11, 2014, 8 pages.
Final Office Action from U.S. Appl. No. 13/608,970, dated Mar. 27, 2015, 17 pages.
Non-Final Office Action for U.S. Appl. No. 13/608,970, dated Dec. 3, 2015, 21 pages.
Kalla et al.. "IBM Power5 chip: a dual-core multithreaded processor", Mar.-Apr. 2004, Micro, IEEE, vol. 24, Issue:2, pp. 40-47.
Final Office Action for U.S. Appl. No. 14/866,875, dated Jan. 13, 2017, 22 pages.
Notice of Allowance for U.S. Appl. No. 13/608,970, dated Apr. 7, 2017, 17 pages.
Non-Final Office Action for U.S. Appl. No. 15/276,290, dated May 5, 2017, 38 pages.
Final Office Action from U.S. Appl. No. 15/276,290, dated Nov. 13, 2017, 20 pages.
Non-Final Office Action from U.S. Appl. No. 14/866,875, dated Nov. 7, 2017, 28 pages.
Notice of Allowance from U.S. Appl. No. 13/608,970, dated Apr. 28, 2017, 7 pages.

* cited by examiner

Scenario Table

| Scenario ID | Scenario | Description |
|---|---|---|
| 1 | BEGIN_PROXY | |
| 2 | END_PROXY | |
| 3 | INIT | |
| 4 | FORK/EXEC | |
| | | |

FIG. 6A

| Scenario | Yield Event Instruction Pointer |
|---|---|
| BEGIN_PROXY | |
| END_PROXY | |
| INIT | |
| FORK/EXEC | |

FIG. 6B

MECHANISM FOR INSTRUCTION SET BASED THREAD EXECUTION OF A PLURALITY OF INSTRUCTION SEQUENCERS

CLAIM TO PRIORITY

This patent application is a continuation of U.S. patent application Ser. No. 13/608,970, entitled "Mechanism For Instruction Set Based Thread Execution On A Plurality Of Instructions Sequencers" filed on Sep. 10, 2012 which is a continuation of U.S. patent application Ser. No. 11/173,326, entitled "Mechanism For Instruction Set Based Thread Execution On A Plurality Of Instructions Sequencers" filed on Jun. 30, 2005, all of which are hereby incorporated by reference in their entirety into this application.

FIELD OF THE INVENTION

Embodiments of the invention relate to methods and apparatus for processing instructions.

BACKGROUND

In order to increase performance of information processing systems, such as those that include microprocessors, both hardware and software techniques have been employed. On the hardware side, microprocessor design approaches to improve microprocessor performance have included increased clock speeds, pipelining, branch prediction, super-scalar execution, out-of-order execution, and caches. Many such approaches have led to increased transistor count, and have even, in some instances, resulted in transistor count increasing at a rate greater than the rate of improved performance.

Rather than seek to increase performance strictly through additional transistors, other performance enhancements involve software techniques. One software approach that has been employed to improve processor performance is known as "multithreading." In software multithreading, an instruction stream may be divided into multiple instruction streams that can be executed in parallel. Alternatively, multiple independent software streams may be executed in parallel.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading ("SoEMT"), only one thread, at most, is active at a given time.

Increasingly, multithreading is supported in hardware. For instance, in one approach, processors in a multi-processor system, such as chip multiprocessor ("CMP") systems (multiple processors on single chip package) and symmetric multi-processor ("SMP") systems (multiple processors on multiple chips), may each act on one of the multiple software threads concurrently. In another approach, referred to as simultaneous multithreading ("SMT"), a single physical processor core is made to appear as multiple logical processors to operating systems and user programs. For SMT, multiple software threads can be active and execute simultaneously on a single processor core. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

For a system that supports concurrent execution of software threads, such as SMT, SMP, and/or CMP systems, an operating system may control scheduling and execution of the software threads.

Alternatively, it is possible that some applications may directly manage and schedule multiple threads for execution within a processing system. Such application-scheduled threads are generally invisible to the operating system (OS) and are known as user-level threads.

Commonly, user-level threads can merely be scheduled for execution by an application running on a processing resource that is managed by an OS. Accordingly, in the typical processing system with multiple processors there is no mechanism to schedule a user-level thread to run on a processor that is not directly managed by the OS.

BRIEF DESCRIPTION OF THE DRAWINGS

FIGS. 6A-6B illustrate tables, in accordance with one embodiment of the invention, that may be used to program a service channel;

DETAILED DESCRIPTION

Figure 1A:
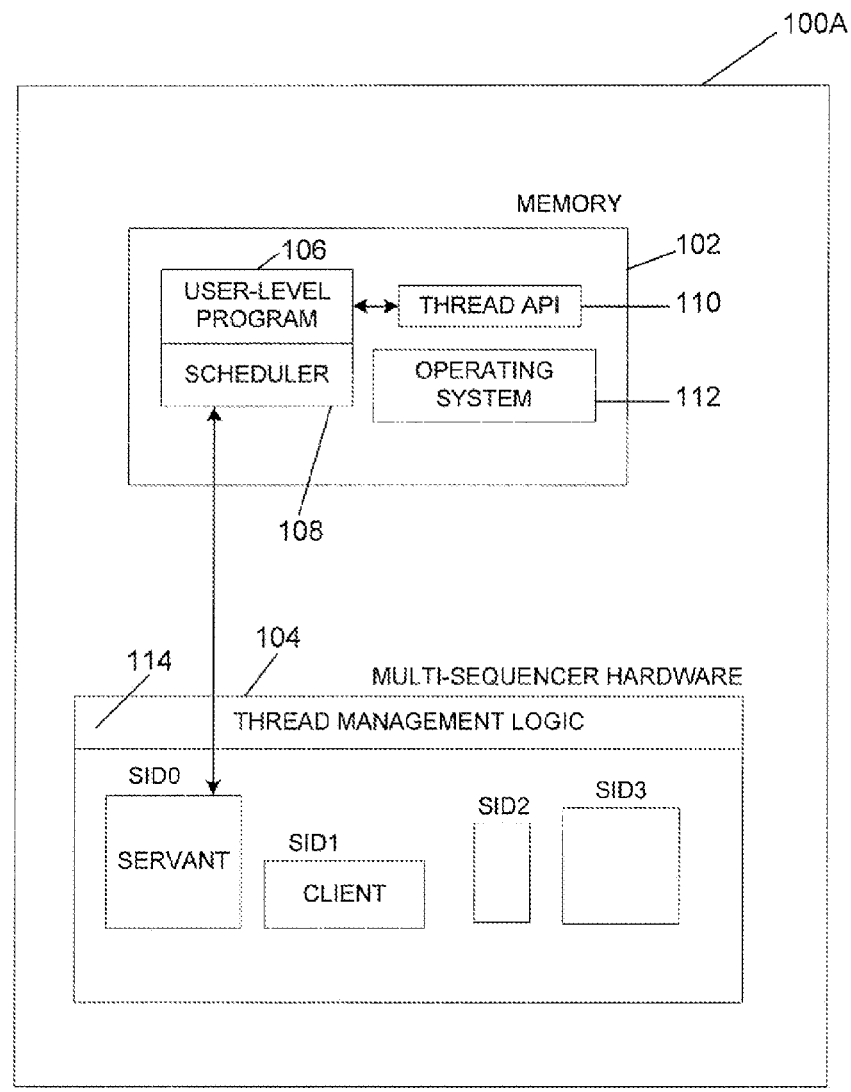
FIGS. 1A and 1B show high-level block diagrams of a multi-sequencer system, in accordance with one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The following description describes embodiments of an architectural mechanism to create and control threads of execution on sequencers of a multiple sequencer system that are sequestered away from OS control.

As used herein, the term "instruction sequencer" or simply "sequencer" includes next instruction pointer logic and at least some processor state. For example, an instruction sequencer may comprise a logical processor, or a physical processor core.

In an embodiment, the architectural mechanism may comprise just two instructions that together define a signaling mechanism to send and receive a signal between any two sequencers without using an OS Application Program Interface. The signal may comprise an architecturally defined event or scenario, which is mapped to handler-code. Upon receipt of the signal at a sequencer, the scenario in the signal acts as a trigger to cause the sequencer to vector to the handler-code. Using the two instructions, it is possible to implement thread creation, thread control, and thread synchronization software primitives provided by existing thread libraries.

Further, the two instructions may be used to create a proxy execution mechanism to cause a servant sequencer to execute code on behalf of a client sequencer, as will be explained in greater detail below.

Accordingly, example processor systems are described that include two or more instruction sequencers to execute different threads. At least some of the two or more instruction sequencers include sequencer-aware user-level instructions in their instruction sets that allow for inter sequencer control by a thread management operation on a specified instruction sequencer without intervention from an operating system. The sequencer-aware user-level instructions may include an instruction sequencer control transfer instruction, an instruction sequencer monitoring instruction, a context save instruction, and a context restore instruction. The processor system may also have thread management logic to respond to a user-level instruction to allow a non-sequestered instruction sequencer to create parallel threads of execution on the associated sequestered instruction sequencers without an operating system scheduler. Also, the processor system may have a proxy execution mechanism to allow a client instruction sequencer to trigger a proxy thread to execute on the servant instruction sequencer on behalf of the client instruction sequencer in response to certain triggering conditions encountered during instruction execution on the client sequencer and without intervention of the operating system.

Turning now to FIG. 1A of the drawings, reference numeral 100A indicates a multi-sequencer system, in accordance to one embodiment of the invention. The multi-sequencer system 100A includes a memory 102 and multi-sequencer hardware 104. The memory 102 comprises a user-level program 106, which includes a scheduler 108 to schedule instructions for execution on the multi-sequencer hardware 104. To express multiple threads of execution, the user-level program 106 makes use of a thread API 110 to a thread library that provides thread creation, control, and synchronization primitives to the user-level program 106. Also located within the memory 102 is an operating system 112. The multi-sequencer hardware 104 includes a plurality of sequencers, only four of which have been shown in FIG. 1A. The four shown sequencers are designated SID0, SID1, SID2, and SID3, respectively.

As used herein, a "sequencer", may be a distinct thread execution resource and may be any physical or logical unit capable of executing a thread. An instruction sequencer may include a next instruction pointer logic to determine the next instruction to be executed for the given thread. A sequencer may be a logical thread unit or a physical thread unit. In an embodiment, multiple instruction sequencers may be within a same processor core. In an embodiment, each instruction sequencers may be within a different processor core.

Included in a given processor core, is an instruction set architecture. The instruction set architecture (ISA) may be an abstract model of the processor core that consists of state elements (registers) and instructions that operate on those state elements. The instruction set architecture serves as a boundary between software and hardware by providing an abstract specification of the processor core's behavior to both the programmer and the microprocessor designer. The instruction set may define the set of instructions that the processor core is capable of decoding and executing.

While the Chip Multiprocessing (CMP) embodiments of the multi-sequencer hardware 104 discussed herein refers to only a single thread per sequencer SID0-SID3, it should not be assumed that the disclosures herein are limited to single-threaded processors. The techniques discussed herein may be employed in any Chip Multiprocessing (CMP) or Simultaneous Multithreading Processor (SMT) system, including in a hybrid system with CMP processors and SMT processors where each core of a CMP processor is a SMT processor or a Switch-On-Event Multiprocessor (SoeMT). For example, the techniques disclosed herein may be used in system that includes multiple multi-threaded processor cores in a single chip package 104.

The sequencers SID0-SID3 are not necessarily uniform and may be asymmetrical respect to any factor that affects computation quality such as processing speed, processing capability, and power consumption. For example, the sequencer SID0 may be "heavy weight" in that it is designed to process all instructions of a given instruction set architecture (e.g. IA32 the Instruction Set Architecture). Whereas, the sequencer SID1 may be "light weight" in that it can only process a selected subset of those instructions. In another embodiment, a heavyweight processor may be one that processes instructions at a faster rate than a lightweight processor. The sequencer SID0 is Operating System (OS)-visible, whereas the sequencers SID1 to SID3 are OS sequestered. However, this does not mean that every heavyweight sequencer is OS-visible or that all lightweight sequencers are sequestered. As used herein, the term "OS sequestered" denotes a sequencer that has transitioned to a sequestered state or condition. A characteristic of such a sequestered state or condition is that the OS does not schedule instructions for a sequencer in such a state.

Figure 2:
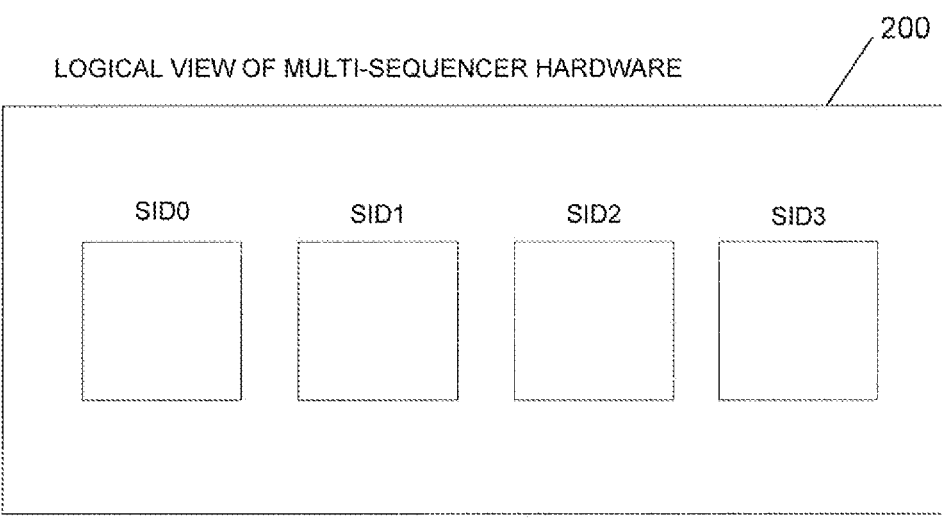
FIG. 2 shows a logical view of multi-sequencer hardware forming a part of the multi-sequencer system of FIGS. 1A-1C.

As will be seen, the multi-sequencer hardware or firmware (e.g. microcode) also includes thread management logic 114. In an embodiment, the thread management logic 114 virtualizes the sequencers SID0-SID3 so that they appear to the user-level program 106, as uniform. In other words, the thread management logic 114 masks the asymmetry of the sequencers SID0-SID3 so that from a logical point of view as seen by an assembly language programmer, the sequencers SID0-SID3 appear uniform, as is depicted in the view 200 shown in FIG. 2 of the drawings.

In the system 100A, shown in FIG. 1A of the drawings, the user-level program 106 is tightly coupled to the multi-sequencer hardware 104. In an embodiment, the user-level program 106 may be loosely coupled to the multi-sequencer hardware 104 through intermediate drivers. Such a system is depicted by reference numeral 100B, in FIG. 1B of the drawings. The system 100B is basically the same as the system 100A, except that instead of using scheduler 108, the user-level program makes use of a kernel level software such as a device driver 116, such as a driver, a hardware abstraction layer, etc, to communicate with kernel level API 118 in order to schedule instructions for execution on the multi-sequencer hardware 104.

Figure 1B:
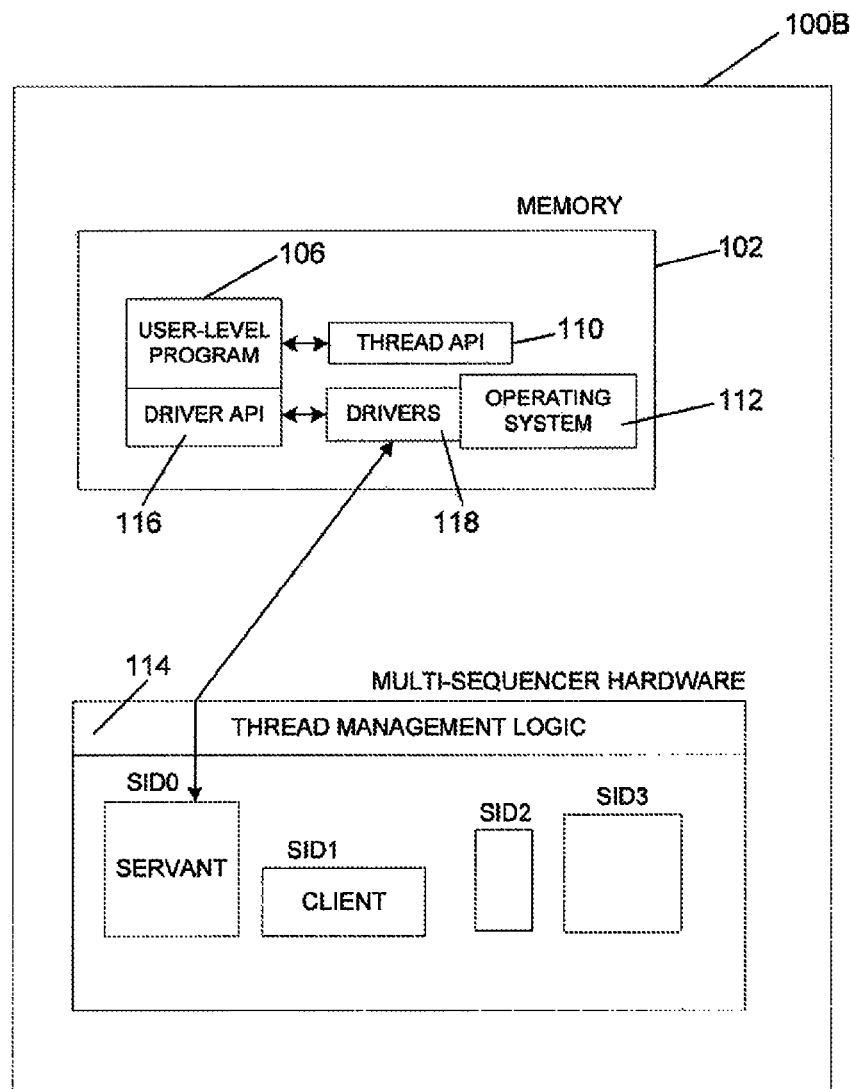
Figure 1C:
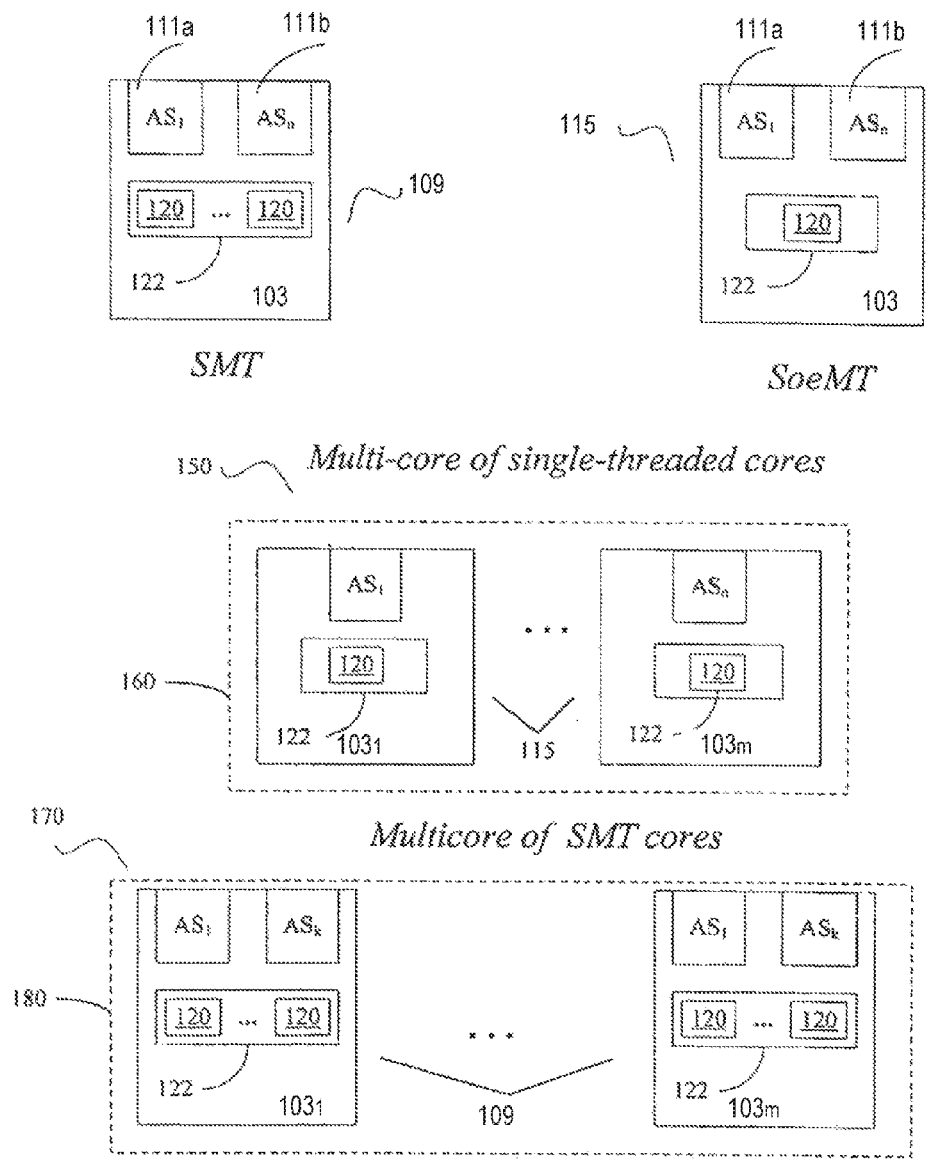
FIG. 1C is a block diagram illustrating selected features of embodiments of a multi-sequencer system that supports control of threads by user-level instructions.

FIG. 1c is a block diagram illustrating selected features of embodiments 109, 115, 150, 170 of a multi-sequencer system that supports control of threads by user-level instructions. FIG. 1c illustrates selected features of an SMT multi-sequencer multithreading system 109, where each sequencer is a logical processor that may execute a thread concurrently with execution of other threads on other logical processors. FIG. 1 also illustrates at least one embodiment of a multi-sequencer system 115 that supports multiple logical sequencers via a switch-on-event (SoeMT) mechanism, such as a time-multiplexing type of switching mechanism, such that each of the logical processors takes turns running its thread—merely one thread executes at a time on such system 115.

FIG. 1c also illustrates selected features of multiple-core multithreading systems 150, 170. The physical cores for a multi-core multithreading system may be either single-sequencer cores (see, e.g., system 150) or may be multi-sequencer cores (see, e.g., system 170). Such multi-core multithreading embodiments are discussed later, below, while the single-core multi-sequencer systems 109, 115 are discussed immediately below.

In the SMT system 109, a single physical processor 103 is made to appear as multiple thread contexts, referred to herein as $TC_1$ through $TC_n$ (not shown). Each of the n thread contexts is effectively a sequencer. When at least some of these thread contexts (e.g. m out of n) are made visible to the operating system and/or user programs, these thread contexts are sometimes referred to as logical processors (not shown), and are referred to herein as $LP_1$ through $LP_m$. Each thread context $TC_1$ through $TC_n$ maintains a set of the architecture state $AS_1$-$AS_n$, respectively. The architecture state includes, for at least one embodiment, data registers, segment registers, control registers, debug registers, and most of the model specific registers. The thread contexts $TC_1$-$TC_n$ share most other resources of the physical processor 103, such as caches, execution units, branch predictors, control logic and buses.

Although such features may be shared, each thread context in the multithreading system 109 can independently generate the next instruction address (and perform, for instance, a fetch from an instruction cache, an execution instruction cache, or trace cache). Thus, the processor 103 includes logically independent next-instruction-pointer and fetch logic 120 to fetch instructions for each thread context, even though the multiple logical sequencers may be implemented in a single physical fetch/decode unit 122. For an SMT embodiment, the term "sequencer" may encompass at least the next-instruction-pointer and fetch logic 120 for a thread context, along with at least some of the associated architecture state, AS, for that thread context. It should be noted that the sequencers of an SMT system 109 need not be symmetric. For example, two SMT sequencers of the same physical processor may differ in the amount of architectural state information that they each maintain.

Thus, for at least one embodiment, the multi-sequencer system 109 is a single-core processor 103 that supports concurrent multithreading. For such embodiment, each sequencer is a logical processor having its own instruction next-instruction-pointer and fetch logic and its own architectural state information, although the same physical processor core 103 executes all thread instructions. For such embodiment, the logical processor maintains its own version of the architecture state, although execution resources of the single processor core 103 may be shared among concurrently-executing threads.

FIG. 1c also illustrates an alternative embodiment of a multi-sequencer system 115 that is capable of executing multi-threaded code. The embodiment 115 is labeled as a Switch-on-Event Multithreading ("SOEMT") embodiment. For such embodiment 115, each sequencer is similar to the sequencers of the previous embodiment 109, in that each sequencer is a logical processor having its architectural state information and own instruction next-instruction-pointer. However, the system 115 differs from that 109 discussed above in that the sequencers each share with the other sequencers the same physical fetch logic 120 in a single fetch/decode unit 122 in the physical processor core 103. The fetch logic 120 may be switched to fetch for different sequencers of the system 115 based on a variety of switch-on-event policies. The switch-on-event triggers may be passage of a specific amount of time or machine cycles, such as time-multiplexing (TMUX). For other embodiments, the SOEMT triggers may other events, such as cache-miss events, page faults, long-latency instructions, etc.

FIG. 1c also illustrates at least two embodiments of multi-core multithreading systems 150, 170. For at least some embodiments of the multi-core system 150, 170 illustrated in FIG. 1c, the system may use a processor 103 as a building block. Each of the sequencers may be a processor core 103, with the multiple cores $103_1$-$103_n$, $103_1$-$103_m$ residing in a single chip package 160, 180, respectively. For system 150 illustrated in FIG. 1c, each core $103_i$ (i=0 to n) may be a single-threaded sequencer. For the system 170 illustrated in FIG. 1c, each core $103j$ (j=1 to m) may be a multi-sequencer processor core.

The chip packages 160, 180 are denoted with broken lines in FIG. 1c to indicate that the illustrated single-chip embodiments of multi-core systems 150, 170 are illustrative merely. For other embodiments, processor cores of a multi-core system may reside on separate chips, or may be organized as an SOEMT multi-sequencer system.

A first multi-core multithreading system 150 illustrated in FIG. 1c may include two or more separate physical processors $103^1$-$103_n$ that is each capable of executing a different thread such that execution of at least portions of the different threads may be ongoing at the same time. Each processor $103_1$ through $103_n$ includes a physically independent fetch unit 122 to fetch instruction information for its respective thread. In an embodiment where each processor $103_1$-$103_n$ executes a single thread, the fetch/decode unit 122 implements a single next-instruction-pointer and fetch logic 120.

FIG. 1c also illustrates a multi-core multithreading system 170 that includes multiple SMT systems 109. For such embodiment 170, each of the core processors $103_1$-$103_m$ supports multiple thread contexts. For example, each of the core processors $103_1$-$103_m$ is an SMT core processor that supports k sequencers such that the system 170 effectively implements m*k sequencers. In addition, the fetch/decode unit 122 for the system 170 implements distinct next-instruction-pointer and fetch logic 120 for each supported thread context.

For ease of illustration, the following discussion focuses on embodiments of the multi-core system 150. However, this focus should not be taken to be limiting, in that the mechanisms described below may be performed in either a multi-core or single-core multi-sequencer system. Also, either single-core or multi-core systems may be implemented with single-sequencer cores or multi-sequencer cores. For each multi-sequencer core, one or more multithreading techniques may be utilized, including SMT and/or SoeMT. It will be understood that the systems 109, 115, 150, 170 shown in FIG. 1c may include additional features, such as a memory system, execution units, and the like, that are not shown in FIG. 1c.

Each sequencer, 103, for the system embodiments 109, 115, 150, 170 illustrated in FIG. 1c may be associated with a unique identifier (discussed below in connection with FIG. 3). Various embodiments of the systems 109, 150 may include a different number, N, of total sequencers.

Embodiments of the systems 109, 115, 150, 170 illustrated in FIG. 1c may each support signaling among sequencers. As used herein, the term "sequencer arithmetic" is used to refer to inter-sequencer signaling for service between two sequencers. Architectural support for sequencer arithmetic may include extensions to an instruction set architecture such that one or more instructions are provided to allow a user direct manipulation of control and state transfers between sequencers. A user-level instruction is said to be "sequencer aware" if it is a sequencer arithmetic instruction or any other type of instruction that includes a logical sequencer address as a parameter, which can be encoded as an instruction operand and/or implicitly referenced upon instruction execution. Such instructions may include sequencer arithmetic instructions that either provide for signaling another sequencer (referred to herein as a "user level control transfer instruction") or provide for setting up a client sequencer to monitor for such a signal (referred to herein as a "user level monitor instruction").

Sequencer aware instructions may also include other instructions that include a logical sequencer address as a parameter, such as sequencer aware state save and restore instruction. Upon execution of such a state save instruction, a first sequencer can create a snapshot copy of the architectural states of a second sequencer. The sequencer aware restore instruction may designate that the save architectural states be loaded to a specified sequencer.

Each sequencer aware instruction may also optionally include more than one logical sequencer addresses as parameters. For example, a sequencer-aware instruction may include as a parameter an aggregate of multiple logical sequencer addresses. Such approach may be utilized for multicasting or broadcasting inter-sequencer signals from one sequencer to multiple other sequencers. In order to simplify the following discussion, examples set forth below may refer, unless otherwise specified, to the unicasting case: a first sequencer executes a sequencer-aware instruction that specifies a single other logical sequencer address. Such approach is made for descriptive convenience and illustrative purposes merely, and should not be taken to be limiting. One of skill in the art will realize that embodiments of the mechanisms discussed herein may be applied to broadcasting and multicasting sequencer-aware instructions as well.

Figure 3A:
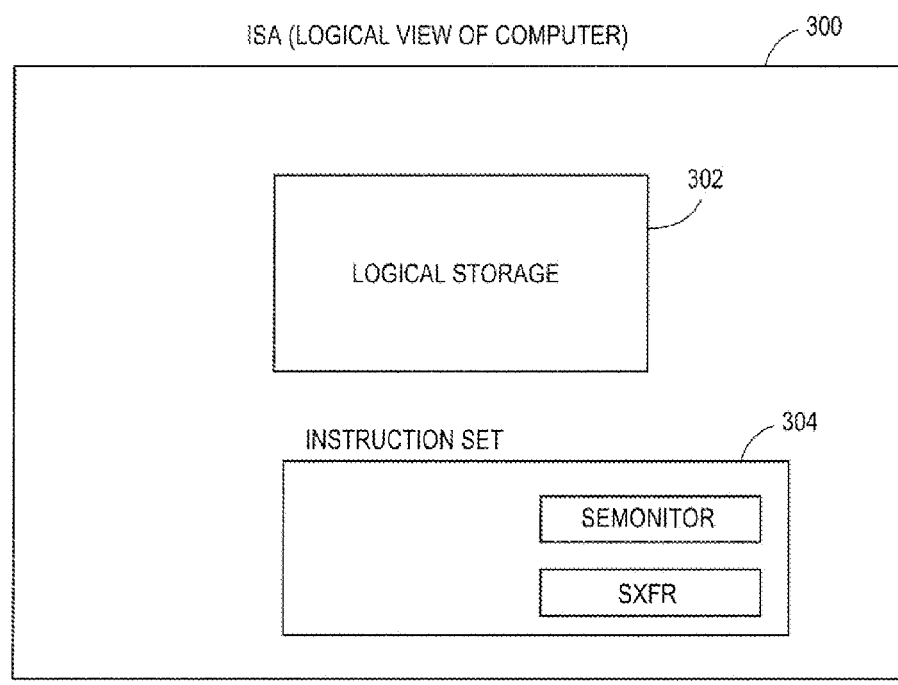
FIG. 3a shows a view of an instruction set architecture for the systems of FIGS. 1A-1C.

FIG. 3a shows a view of an instruction set architecture for the systems of FIGS. 1A-1C. Referring now to FIG. 3a of the drawings, there is shown an Instruction Set Architecture (ISA) view 300 of the systems 100A, and 100B. An ISA defines a logical view of a system, as seen by an assembly language programmer, binary translator, assembler, or the like. In terms of its ISA, the systems 100A, and 100B include a logical storage 302 and an instruction set 304. The logical storage 302 defines a visible memory hierarchy, addressing scheme, register set, etc. for the systems 100A, and 100B, whereas the instruction set 304 defines the instructions and the format of the instructions that the systems 100A, and 100B support. In an embodiment, the instruction set 304 may comprise the instruction set known as the IA32 instruction set and its extensions, although other instruction sets are possible. Additionally, in an embodiment, the instruction set 304 includes two instructions known as a user-level control-transfer instruction, and a user-level monitoring instruction. An example of a user-level control-transfer instruction may be a SXFR instruction. An example of a user-level monitoring instruction may be a SEMONITOR instruction. An example SXFR instruction and SEMONITOR instruction will be discussed to assist in understanding of a user-level control-transfer instruction and a user-level monitoring instruction.

Broadly, the SXFR instruction is used to send a signal from a first sequencer to a second sequencer, and the SEMONITOR instruction is used to configure the second sequencer to monitor for the signal from the first sequencer. Further, these control transfer and monitoring instructions are sequencer aware, as will be discussed later, and can compose more sequencer aware composite instructions.

Figure 3B:
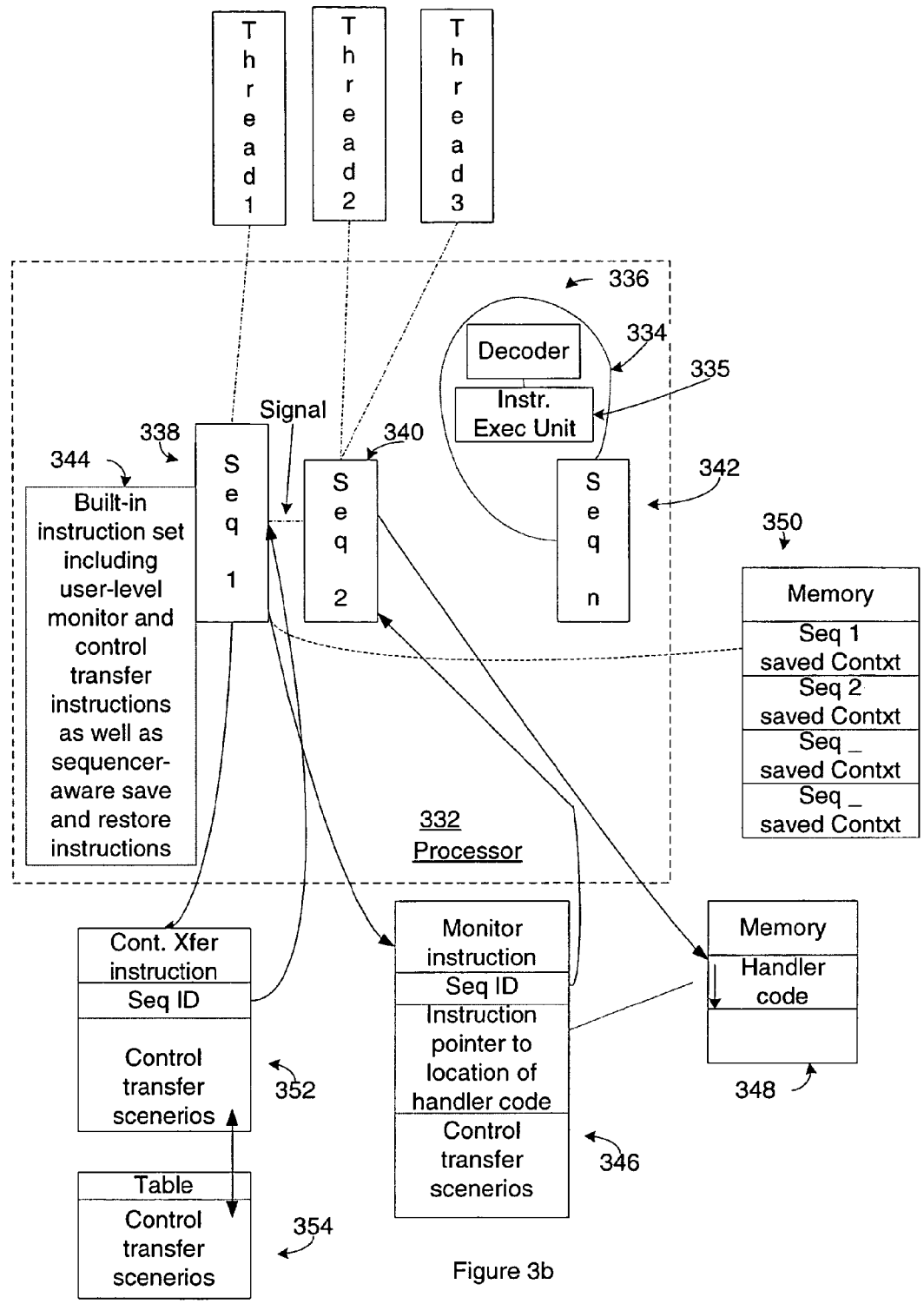
FIG. 3b illustrates a logical diagram of an embodiment of a processor with two or more instruction sequencers that include a user-level control-transfer instruction and a user-level monitor instruction in their instruction sets.

FIG. 3b illustrates a logical diagram of an embodiment of a processor with two or more instruction sequencers that include a user-level control-transfer instruction and a user-level monitor instruction in their instruction sets. The processor 332 may include one or more instruction sequencers 338-342 to execute different threads. In an embodiment, multiple instruction sequencers can share a decoder unit and/or instruction execution unit. Likewise, each instruction sequencer can have its own dedicated process instruction pipeline that includes a decoder unit, such as a first decoder unit 334, an instruction execution unit such as a first instruction execution unit 335, etc. At least some of the multiple instruction sequencers 338-342 include instruction sets 344 that at least include a user-level monitoring instruction (such as a SEMONITOR instruction), a user-level control-transfer instruction (such as a SXFR instruction), a sequencer-aware store instruction (such as a SSAVE instruction), and a sequencer-aware restore instruction (such as a SRSTOR instruction). Alternatively, the sequencer-aware store and restore instructions may not be part of the instruction set 344. Rather, the user-level control-transfer and monitoring instructions may be part of the instruction set and then used in conjunction with a scenario and a pointer to handler code to compose the sequencer-aware store and restore instructions. Types of scenarios, which may be architecturally defined composite triggering conditions based on micro architectural events, will be described later.

The flow of the control transfer operation may occur as follows.

A first instance of the user-level monitoring instruction 346 may specify one of the instructions sequencers, a pointer to a location of handler code, and one of a number of control-transfer scenarios. The monitoring instruction 346 may cause the executing instruction sequencer, such as a first instruction sequencer 338, to setup the specified instruction sequencer to invoke the handler-code at the specified memory location upon observing or receiving signaling of the specified control-transfer scenario. The first memory location 348 storing the handler code may be a register, a cache, or other similar storage device. The user-level monitoring instruction 346 may be executed first to set up a specified target instruction sequencer to receive a control-transfer signal before the source instruction sequencer sends this control-transfer signal.

The executing instruction sequencer, such as the first instruction sequencer 338, may execute a sequencer-aware save instruction in order to save the context state of target instruction sequencer. The context state of the destination instruction sequencer may be stored in a second memory location 350. The second memory location may be a different location within a shared memory array or in a discrete memory area than the first memory location.

A first instance of the control-transfer instruction 352 may specify one of the instruction sequencers and one of the many control-transfer scenarios. The specified control-transfer scenario may be stored in, for example, a table 354. The control-transfer instruction 352 causes the executing instruction sequencer to generate a control-transfer signal to be received by the specified target instruction sequencer, such as a second instruction sequencer 340.

The specified target instruction sequencer 340 detects the control-transfer signal generated in response to the execution of the control-transfer instruction 352 that specifies that instruction sequencer. The specified target instruction sequencer 340 then executes the handler code specified by the monitoring instruction 346 that specified that instruction sequencer.

After the execution of the handler code has finished, the first instruction sequencer 338 (i.e. the source instruction sequencer) may execute a sequencer-aware restore instruction to restore the context state of target instruction sequencer from its location in the second memory location 350.

In an embodiment, a processor may include multi-sequencer hardware. Each instruction sequencer is capable of executing different threads. At least some of the multiple instruction sequencers are capable of executing user-level instructions. The user-level instructions may be sequencer-aware. Each of the user-level instructions may contain information that specifies at least one of the multiple instructions sequencers. Execution of the instructions on an executing sequencer causes the executing instruction sequencer to perform a thread management operation on the specified one of the multiple instruction sequencers without operating system intervention. The thread management operation may be a thread creation, a thread control, or a thread synchronization operation. Examples of the user-level instructions include the sequencer-aware SXFR, SEMONITOR, SSAVE, and SRSTR instructions described in more detail below.

Figure 4A:
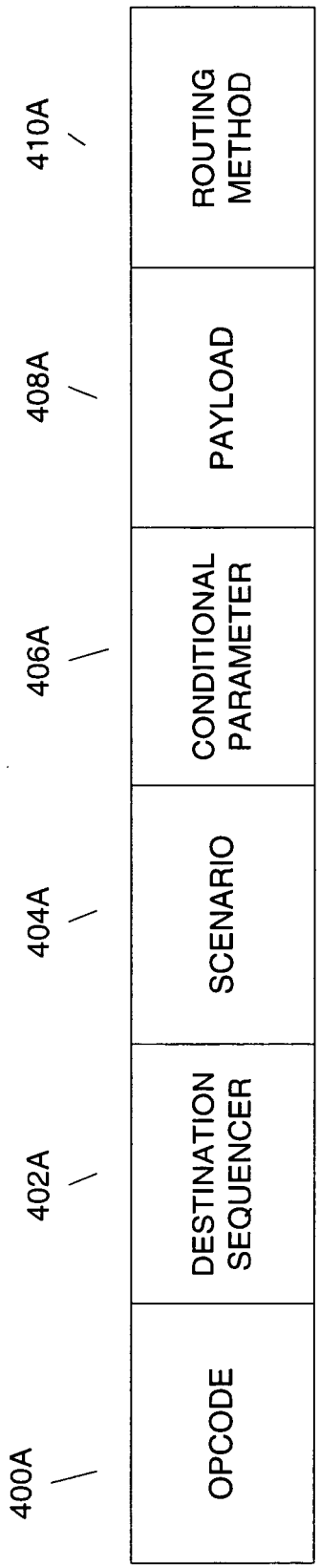
FIGS. 4A and 4B shows the format of the SXFR and SEMONITOR instructions, respectively, in accordance to one embodiment of the invention.

In an embodiment, the SXFR instruction includes the instruction format shown in FIG. 4A of the drawings. Referring to FIG. 4A, it will be seen that the SXFR instruction includes an opcode 400A, and operands 402A to 410A. The operand 402A corresponds to a sequencer ID (SID) for a destination/target sequencer to which the signal is sent. The operand 404A comprises a scenario or control message, which may be an architecturally defined identifier code representing a condition or anticipated event. A scenario may be used to effect asynchronous control transfer as will be described. Referring to FIG. 6A of the drawings, there is shown a table of scenarios in accordance with one embodiment of the invention. Broadly, the scenarios may be divided into intra-sequencer scenarios, and inter-sequencer scenarios. In an embodiment, the intra-sequencers scenarios fall into the category of resource not available (RNA), which is a category for events generated during execution on a sequencer due to access to a resource not being available on the sequencer. In an embodiment, scenarios that fall into the category of RNA include a page fault, a system call on OS-sequestered sequencer that is incapable of directly activating OS service, or a deprecated operation fault. A deprecated operation fault is a fault caused by a limited or deprecated subset of ISA features implemented on the sequencer. For example, a deprecated operation fault may occur when attempting to execute an instruction that requires a floating point adder, on a sequencer that does not physically implement a floating point adder. To those familiar with the arts, the mechanism described here can be implemented at different level abstractions, in application software, system level software, or firmware like microcode, or in hardware.

Examples of inter-sequencer scenarios include an initialize scenario referenced as an "INIT" scenario, a "FORK/EXEC" scenario, and a "PROXY" scenario. The INIT scenario causes a sequencer whose SID is specified in a SXFR instruction to cause a set of sequencer-specific architectural states (such as general purpose registers or machine specific control registers) to be respectively initialized to a set of initial values, whereas the FORK/EXEC scenario causes a thread executing on a sequencer that executes a SXFR instruction to fork or start a parallel thread of execution on a sequencer identified by the destination SID in a SXFR instruction, by set particular values to the destination sequencer states that include at least instruction pointer (EIP) and/or stack pointer (ESP). The PROXY scenario is used to cause a sequencer identified by the SID in a SXFR instruction to operate in a proxy execution mode, for example, in order to process instructions on behalf of the sequencer that executed the SXFR instruction. For example, in an embodiment, the sequencer that operates in a proxy execution mode may be used to process instructions that cannot be processed on a sequencer that supports only a deprecated set of ISA features. In an embodiment, the PROXY scenario may be divided into a BEGIN_PROXY scenario, and an END_PROXY scenario. The BEGIN_PROXY scenario causes an instruction sequencer to operate in proxy execution mode, as described, whereas the END_PROXY scenario terminates operation of the proxy execution mode.

Referring again to FIG. 4A of the drawings, in an embodiment, the operand 406A comprises a conditional parameter that conditions execution of instructions on a sequencer that executes a SXFR instruction. Examples of conditional parameters include a "WAIT" and a "NOWAIT" parameter.

For example, when SXFR is used with the PROXY scenario, the WAIT conditional parameter causes the execution of instructions on a sequencer that executes a SXFR instruction to stop while waiting for completion of proxy execution on another sequencer. The NOWAIT conditional parameter specifies that execution on a sequencer that executes a SXFR instruction may continue in parallel with proxy execution on another instruction sequencer.

In an embodiment, the operand 408A comprises a scenario specific payload or data message. For example in the case of the FORK/EXEC scenario, the payload may comprise an instruction pointer at which execution on the sequencer identified by the operand 402A is to commence. According to different embodiments, the payload may comprise an instruction pointer, a stack pointer, etc. Addresses contained in the payload may be expressed in a variety of addressing modes such as literal, register indirect, and base/offset addressing.

The operand 410A specifies a routing function on the SID contained in the operand 402A. The routing function controls whether the signal generated as a result of executing a SXFR instruction is sent as a broadcast, a unicast, or a multicast signal. The routing function can also encode topology-specific hint information that can be used to assist an underlying inter-sequencer interconnect in routing to deliver the signal.

Figure 4B:
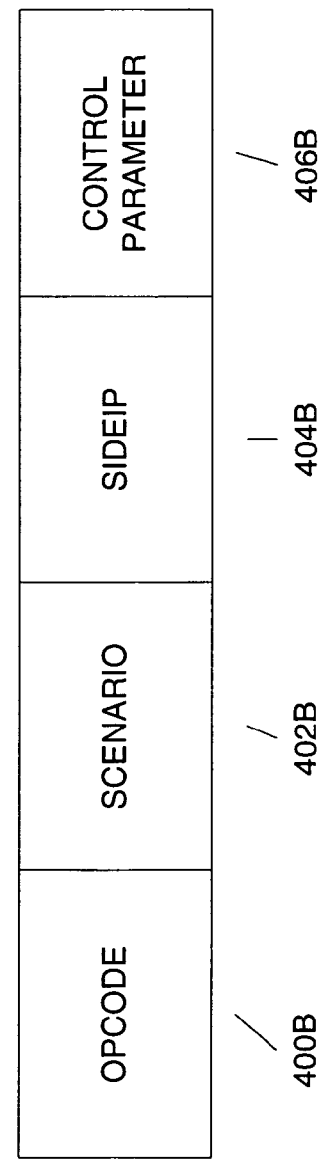

Referring now to FIG. 4B of the drawings, there is shown the format of a SEMONITOR instruction, in accordance with one embodiment of the invention. As can be seen, the SEMONITOR instruction includes an opcode 400B, and operands 402B to 406B. The operand 402B specifies a scenario, which may, for example, be expressed in terms of a scenario ID. The operand 404B specifies a tuple comprising a sequencer ID (SID) and an instruction pointer (EIP). For descriptive convenience, the tuple is referred to as a "SIDEIP".

The SEMONITOR instruction maps a scenario specified in the operand 402B to a SIDEIP specified in the operand 404B. Thus, the SEMONITOR instruction may be used to create a mapping table, such as is shown in FIG. 6B of the drawings, which maps each scenario to a specific SIDEIP. Each mapping of a scenario to a specific SIDEIP is termed a "service channel". The operand 406B allows a programmer to input one or more control parameters to control how a particular service channel is serviced, as will be explained in greater detail below. A programmer may use the SEMONITOR instruction to program the service channels that a particular sequencer uses to monitor for a given scenario. In an embodiment, when the anticipated condition corresponding to a scenario is observed, a sequencer incurs a yield event to cause asynchronous control transfer to a yield event handler starting at the SIDEIP mapped to the scenario. For example, in the case of the anticipated condition corresponding to a fault, once a control yield event is incurred, the current (return) instruction pointer is pushed onto the current stack and control is transferred to the SIDEIP mapped to the observed scenario. In the case of the anticipated condition corresponding to trap, then the next instruction pointer is pushed onto the current stack and control is transferred to the SIDEIP mapped to the observed scenario. A fault may dispose of an instruction before that instruction is executed. A trap may dispose of an instruction after the instruction is executed.

In an embodiment, an architecturally defined blocking bit may be set to prevent recursive triggering of a yield event until the blocking bit is reset. A special return instruction may atomically reset the blocking bit and return control from the yield event handler back to the original code whose execution generated the yield event.

Based on the above description it will be appreciated that both the SXFR and SEMONITOR are "sequencer-aware" in that they include operands that identify particular sequencers. Further, the SSAVE and SRSTOR instructions, described later, are also "sequencer-aware" in that they include operands that identify particular sequencers. Also, these user-level instructions may be "sequencer-aware" in that they have a pointer to instructions in handler code. The handler code when executed by an instruction execution unit references one or more specific instruction sequencers when that handler code is executed. The handler code is associated with the user level instruction because the user level instruction directs the instruction pointer to the start of the handler code and the user level instruction directs the operations of the thread after the handler code is finished executing. Thus, the user level instructions may be sequencer aware if the user level instructions have either 1) a field that makes a specific reference to one or more instruction sequencers or 2) implicitly references with a pointer to handler code that specifically addresses one or more instruction sequencers when the handler code is executed.

In an embodiment, the instructions SXFR and SEMONITOR may be used to implement inter-sequencer control transfer as will be described, with reference to FIG. 5 of the drawings.

Figure 5:
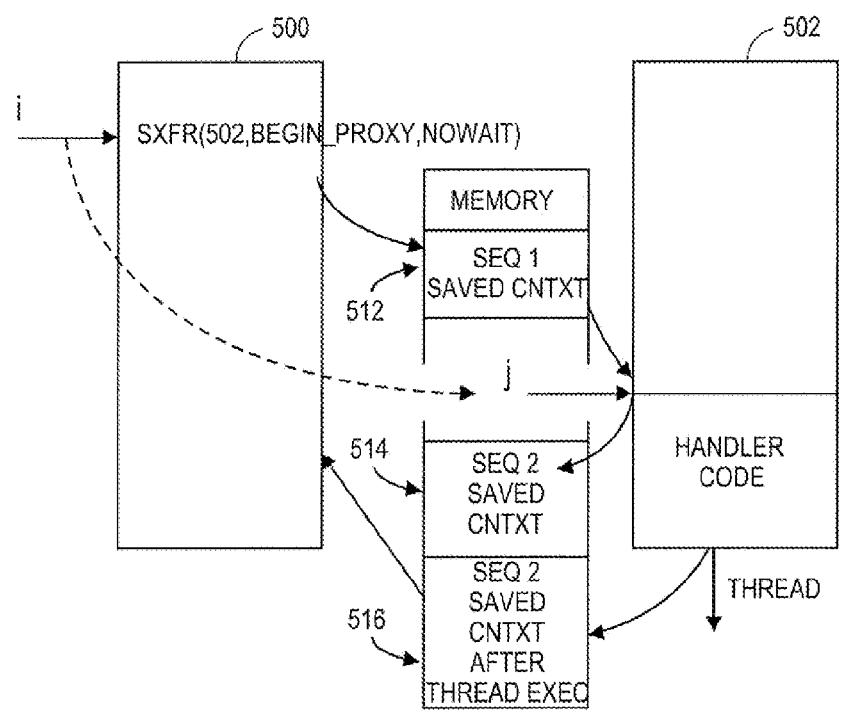
FIG. 5 illustrates how the SXFR instruction can be used to implement inter-sequencer control transfer, in accordance with one embodiment of the invention.

Referring to FIG. 5, a sequencer 500, upon encountering an SXFR instruction at an instruction pointer "I" transfers control to sequencer 502, to cause the sequencer 502 to start executing handler instructions starting at an instruction pointer "J". In an embodiment, a SXFR instruction in the format: SXFR (SID, SCENARIO_ID, CONDITIONAL_ PARAMETER), for example, SXFR (502, BEGIN_ PROXY, NOWAIT) may be used to affect the control transfer. Taking a closer look at the format of the SXFR instruction, the "SID" appearing in the instruction, is a reference to the sequencer identifier (SID) for the sequencer 502. The "SCENARIO_ID" part of the instruction is a reference to a scenario which, as described above, can be programmed into the system 100A, and 100B to cause asynchronous control transfer. As noted above, in an embodiment, the system 100A, and 100B supports the scenarios shown in the scenario table in FIG. 6A of the drawings. Each scenario is encoded to a scenario identifier (ID). In an embodiment, values corresponding to a particular scenario ID may be programmed into a register, from which it may be read when the SXFR instruction is executed.

In an embodiment, in order to resolve the instruction pointer associated with the "SCENARIO_ID" part of the SXFR instruction, the mapping table of FIG. 6B, which maps each scenario to a SIDEIP, is used.

As described above, in order to populate the table of FIG. 6B with the service channels, the SEMONITOR instruction is used. For example, the instruction SEMONITOR (1, (502,J)) which is of the format: SEMONITOR (SCENARIO_ ID, SIDEIP), maps the instruction pointer "J" on sequencer 502 to the scenario indicated by SCENARIO_ ID=1, i.e. the BEGIN_PROXY scenario. Execution of the instruction SXFR (502, 1), on the sequencer 500 causes a signal including a SCENARIO_ID of 1 to be delivered to the sequencer 502.

In response to the signal, the sequencer 502 incurs a yield event that causes a control transfer to the instruction pointer "J" at which with handler-code associated with the BEGIN_ PROXY scenario begins. In an embodiment, instead of immediately executing the handler-code starting at the instruction pointer "J" in response to receiving the signal, the sequencer 502 may queue a number of received signals, and once the number of the signals exceeds a threshold, the sequencer 502 serving the signals by executing handler-code associated with the various signals. In an embodiment, the particular manner in which the sequencer 502 is to process a signal, i.e. whether by immediate processing, or by delayed processing using a queue, and the value of the threshold, is controlled or configured by the control parameter 406B in the SEMONITOR instruction. This queuing of requests can also be done in software as well.

In an embodiment, the handler-code may contain instructions to cause a service thread to start executing on the instruction sequencer 502. Basically, a service thread is any thread that aids or assists in the execution of a first thread executing on another sequencer, i.e. sequencer 500 in the case of FIG. 5. In order for the service thread to execute on the sequencer 502, there should be some form of state transfer between the sequencers 500 and 502. In an embodiment, a sequencer-specific context save instruction and a sequencer-specific context restore instruction is provided in addition to the SXFR and SEMONITOR instructions. The sequencer context save instruction is denoted as SSAVE and the sequencer context restore operation is denoted as SRSTOR. Both SSAVE and SRSTOR are sequencer-aware instructions. Alternatively, a minimal canonical instruction set may merely include the SXFR and SEMONITOR instructions. For example, in an embodiment, scenarios for sequencer context save and/or restore are defined. When the SXFR and SEMONITOR instructions are used in conjunction with a scenario and a pointer to handler code. The corresponding handler code on the target sequencer can perform the respective sequencer context save and/or restore operation, achieving the same effects of the dedicated SRSTOR and SSAVE instructions.

In another embodiment, a sequencer-aware context save instruction may be synthesized by having a scenario that maps to a code block to perform a sequencer-aware context save. Likewise, it is possible to synthesize a sequencer-aware context restore operation using a scenario.

In an embodiment, both the SSAVE and SRSTOR instructions include an operand corresponding to a SID, and operand comprising an address for a "save area" at which the state for the sequencer identified by the SID operand is to be saved. In the example of FIG. 5, in order for the sequencer 502 to be able to execute a service thread to facilitate or help execution of a first thread running on the sequencer 500, it is necessary for the sequencer 502 to have access to the execution context for the first thread. To make the execution context for the first thread available to the sequencer 502, the instruction SSAVE, is first executed on the sequencer 502 to save the execution context for the first thread executing on the sequencer 500 in a first memory location 512. In order to preserve the existing work done on sequencer 502 prior to performing service thread computation on behalf of sequencer 500, the currently running code (hereinafter "prior code") on 502 may perform SSAVE to save the execution context of the prior code to a second memory location 514. The save areas, the first memory location 512 and the second memory location 514 are not overlapping.

Once the execution context of the prior code is saved in the second memory location 514, the sequencer 502 executes a SRSTOR instruction indicating the first memory location 512 to change the sequencer states of the sequencer 502 to the execution context/state associated with the processing of the first thread on the sequencer 500. Thereafter, the sequencer 502 may commence execution of the service thread. While the service thread is executing, the options for the sequencer 500 include waiting for the service thread to complete execution, or to switching to execute a second thread. Once the service thread completes execution on the sequencer 502, the sequencer 502 executes a SXFR instruction to send a signal to sequencer 500 to indicate that the execution of the service thread has completed. Prior to sending the signal to the sequencer 500 to indicate that execution of the service thread has completed, the sequencer 502 executes a SSAVE instruction to save an updated execution context for the first thread after completion of the service thread in a first memory location 516.

In the case where sequencer 500 is waiting for service thread to complete execution, the service thread on sequencer 502 can then perform SRSTOR indicating the third memory location 516 to update the execution context for the first thread on sequencer 500, prior to executing SXFR to notify sequencer 500 to resume code execution. After notifying sequencer 500 of completion of service thread Alternatively, upon receipt of the signal to indicate completion of the service thread from the sequencer 502, the sequencer 500 executes a SRSTOR (500, POINTER_TO_SAVE_AREA_B) instruction to change the execution context of the sequencer 500 to that of the first thread upon completion of the service thread.

In an embodiment, the saving and restoring of an instruction sequencer's context state can be performed remotely on a target sequencer. The source sequencer sends a message for the target instruction sequencer to save and/or restore its sequencer's context state. This could be implemented as a SXFR instruction with a particular scenario.

Figure 7:
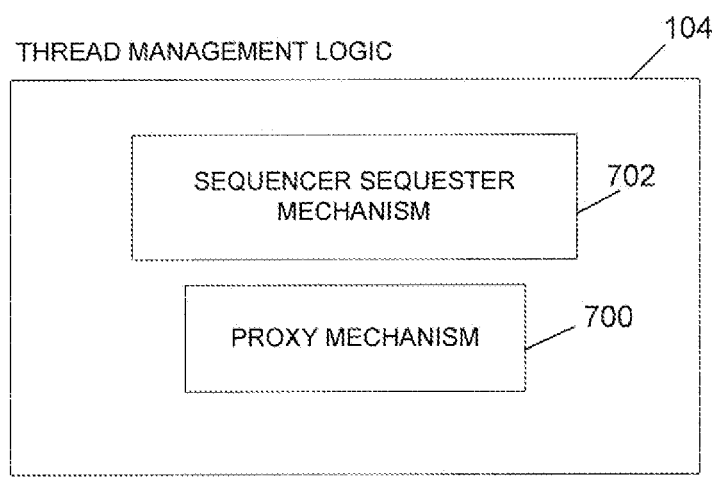
FIG. 7 shows a functional block diagram of the components that make up the thread management logic of the systems of FIGS. 1A-1C, in accordance with one embodiment of the invention.

In an embodiment, the thread management logic 114 includes a proxy execution mechanism 700, and a sequencer sequester mechanism 702 as can be seen in FIG. 7 of the drawings.

Figure 8:
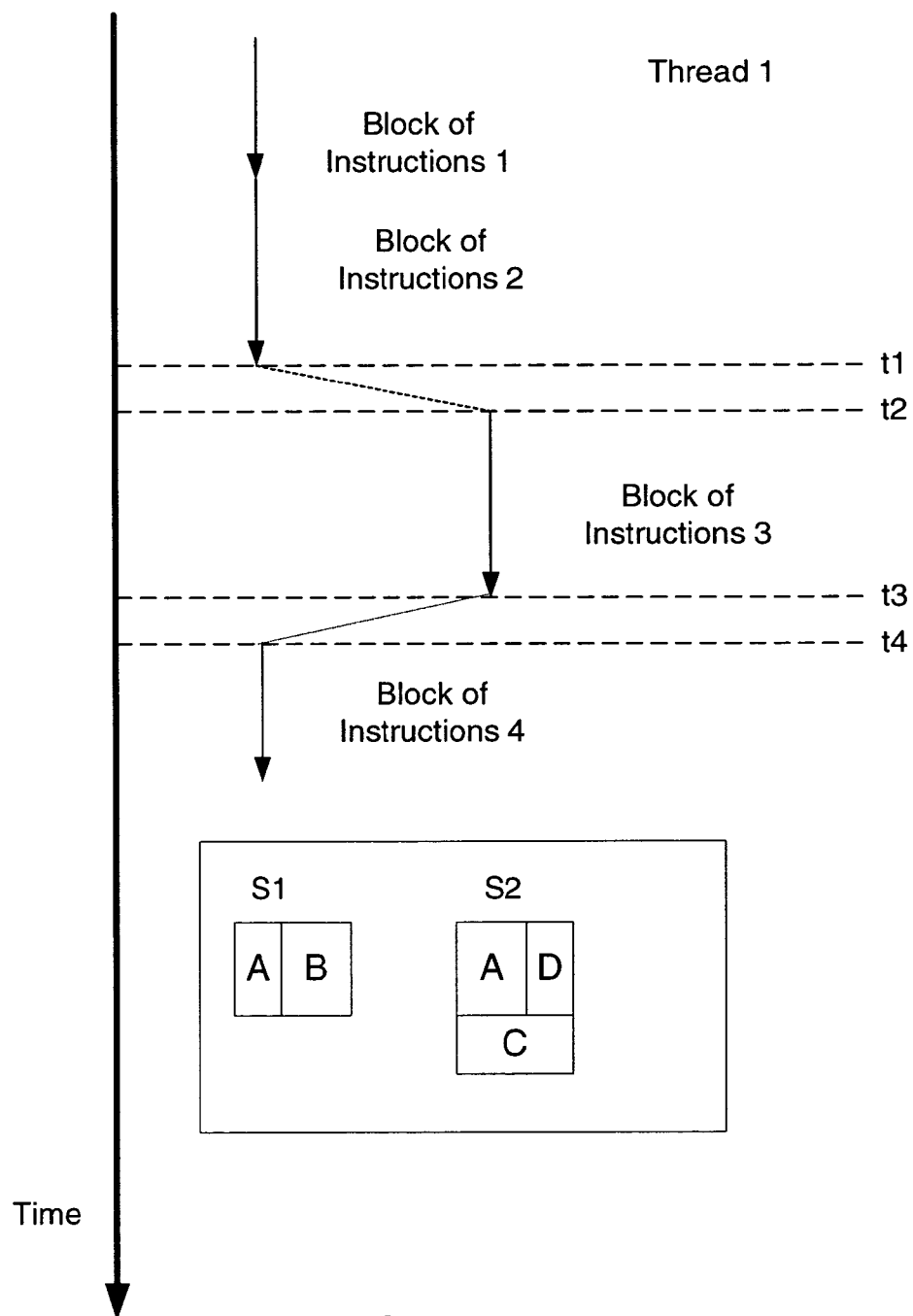
FIG. 8 illustrate the operation of a proxy execution mechanism, in accordance with one embodiment of the invention.

To illustrate the operation of the proxy execution mechanism 700, consider the system 800 shown in FIG. 8 of the drawings, which includes two sequencers designated S1, and S2 respectively. The sequencers S1, and S2 may be symmetrical or asymmetrical with respect to each other. In this example the sequencers are asymmetrical, with the sequencer S1 including only processing resources A and B, whereas the sequencer S2 includes processing resources A, D, and C. The processing resources of the sequencer S1 must be able to support the execution of the instruction blocks 1 and 2.

Time (T1) is located at the end arrow of the block of instructions 2. T1 shows the monitor detects an event that causes the migration of the single thread from the client instruction sequencer S1 to the servant instruction sequencer S2. At time T1, a third block of instructions is scheduled to execute on the sequencer S1, however the third block of instructions requires the use of a processing resource not available on the sequencer S1, say, the processing resource D, which is available on the sequencer S2. At this point, the sequencer S1, at least in an embodiment incurs a resource-not-available fault and a resource-not-available handler which may be defined in user-level software (or in thread management logic hardware or firmware) invokes the proxy execution mechanism 700 to cause the third block of instructions to be migrated to the sequencer S2 for execution thereon.

Time (T2) is located at the beginning of the line to the arrow of the third block of instructions. T2 shows the start of the execution of a block of instructions from the single thread on the servant instruction sequencer S2 on behalf of the client instruction sequencer S1.

Time (T3) is located at the end arrow of the third block of instructions. T3 shows the completion of the execution of a block of instructions from the single thread on the servant instruction sequencer S2. At time t3, after execution of the third block of instructions on the sequencer S2 using the processing resource D, the sequencer S2 uses the proxy execution mechanism 700 to signal to the sequencer S1 that execution of the third block of instructions has completed.

Time (T4) is located at the beginning of the line to the arrow of a fourth block of instructions. T4 shows the completion of the proxy execution of a block of instructions from the single thread on the servant instruction sequencer S2 and the transfer back to the client instruction sequencer S1. The sequencer S1 can then proceed to execute, a fourth block of instructions, which merely requires processing resources available on the sequencer S1.

Since, in above example, the sequencer S1 is using the sequencer S2 to execute an instruction block on its behalf, the sequencer S1 is called a "client" sequencer. The sequencer S2, which operates in a proxy execution mode to execute an instruction block on behalf a client sequencer, is known as a "servant" sequencer. The resource D may comprise a highly specialized functional unit for a limited set of applications. The functional unit may be relatively power hungry, costly, and complex. Thus, in order to save costs, in a particular implementation the resource D is only implemented on the sequencer S2, and not on the sequencer S1. However, as noted above, the proxy execution mechanism 700 masks the asymmetry between the sequencers in a multi-sequencer system by mapping the processing resources available on the various sequencers in a multi-sequencer system so that a client sequencer can use the proxy execution mechanism to migrate a thread to execute on a sequencer that has a processing resource required, or optimized to execute the thread. The proxy execution mechanism 700, may also be used to migrate an instruction block executing on a OS-sequestered sequencer, to an OS-visible sequencer, e.g. in order to perform an OS service, such as the handling of a page fault or a syscall, as will be explained in greater detail below with reference to FIG. 11 of the drawings.

For a given physical implementation of the multi-sequencer system with asymmetric resource organization, the proxy execution mechanism 700 may be constructed using the SEMONITOR and SXFR instructions, as described above, and include a mapping mechanism. In general, the proxy execution mechanism 700 may reside in hardware, in firmware (e.g. microcode), or at a system software layer, or application software layer. In an embodiment, the proxy execution mechanism 700 may use the SEMONITOR and SXFR instructions to handle two categories of proxy services. The first category is known as an egress service scenario, whereas the second category is known as the ingress service scenario. On a client sequencer, for a set of resources and the associated operations that are not available or physically not supported in the client sequencer, egress service scenarios are defined to trap or fault these operations. Each egress scenario is mapped to a sequencer ID (and instruction pointer (SIDEIP)) pointing to a servant sequencer. The mapping may be achieved in hardware, firmware or even in software. The proxy access of the servant sequencer can then be achieved using inter-sequencer signaling, as described above.

A servant sequencer is responsible for supporting proxy access to the resources that are not present in a client sequencer but present on the servant sequencer. The ingress service scenarios are defined and configured into the service channel and mapped to the local service handlers (handler-code) that perform the proxy execution on behalf of the client sequencers. A list of sample egress and ingress service scenarios is provided in the table of FIG. 6A.

In one sense, an egress service scenario corresponds to a trap or fault operation that incurs a "miss" at a client sequencer due to required access to a processing resource not available on the client sequencer yet available on a servant sequencer. Conversely, an ingress service scenario corresponds to asynchronous interrupt condition indicating the arrival of a request to access a local processing resource, available on the servant sequencer, on behalf of a client sequencer that does not possess the local processing resource. The proxy execution mechanism defines a veneer or layer of abstraction associated with each sequencer in a multi-sequencer so that the client and servant sequencers work in concert to perform proxy resource access. In at least one embodiment where the proxy execution is implemented in firmware or directly in hardware, the proxy resource access is transparent to user-level software and to an OS.

Each service scenario plays a similar role to that of an opcode in a traditional ISA, except that a service scenario triggers a special handler-code flow. Thus, it is possible to synthesize new composite instructions using the SXFR instruction as meta-instruction and an egress service scenario mapped to handler-code for the instruction being synthesized. In an embodiment, the relationship between a service scenario ID, and its handler-code flow is akin to the relationship between a Complex Instruction Set Computer (CISC) opcode and its corresponding microcode flow. The CISC can be composed by using the user-level sequencer aware monitor and control transfer instructions as the canonical instruction basis to build the microcode flow. As described above, the mapping between a service scenario and its handler-code is achieved via SEMONITOR, while SXFR provides a mechanism for sending control messages between sequencers. The communication of the control messages act as a trigger for the execution of handler-code mapped to the service scenarios.

Figure 9:
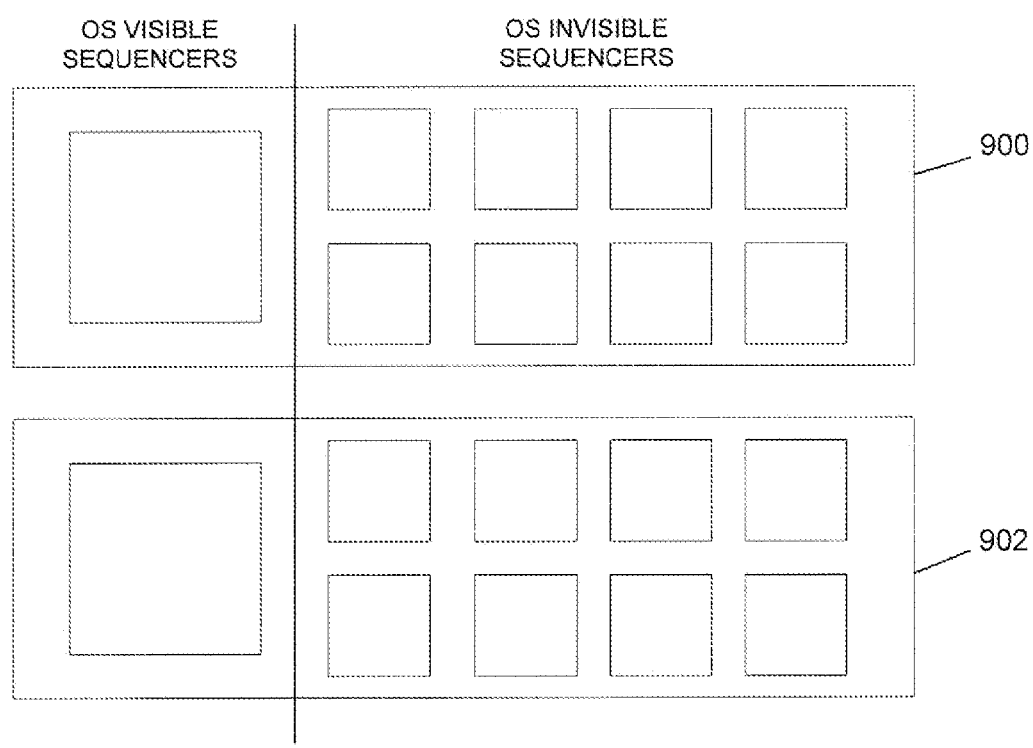
FIGS. 9 and 10 show examples of logical processors, in accordance with one embodiment of the invention.

In an embodiment, the sequencer sequester mechanism 702 may be used to map or group a particular combination of OS-visible sequencers and OS-sequestered sequencers to form a logical processor. The mapping may be a one-to-many mapping comprising a single OS-visible sequencer mapped to many OS-sequestered sequencers, or a many-to-many mapping comprising many OS-visible sequencers mapped to many OS-sequestered sequencers. For example, FIG. 9 shows a multi-sequencer system comprising two logical processors 900 and 902, respectively. Each of the logical processors 900, and 902 comprise a one-to-many mapping in which a single OS-visible sequencer is mapped to many OS-sequestered sequencers.

Figure 10:
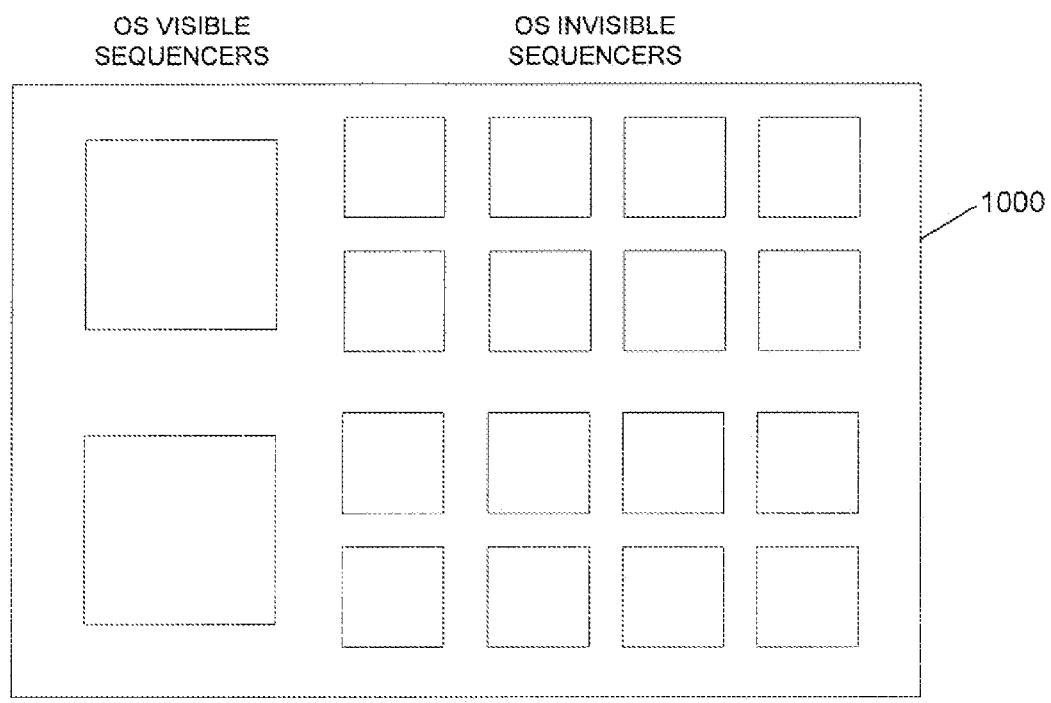

Turning to FIG. 10, an example multi-sequencer system 1000 may include an ensemble of 18 sequencers in which two OS-visible sequencers are mapped to 16 OS-sequestered sequencers to define a many-to-many mapping. Within the logical processor of the system 1000, both of the OS-visible sequencers can serve as a proxy for any of the OS-sequestered sequencers.

In an embodiment, the sequencer sequester mechanism 702 may selectively sequester sequencers away from OS control. According to different embodiments of the invention, the sequencers may be sequestered post boot or in some cases even during boot time. In order to sequester a sequencer under OS control, the sequencer sequester mechanism 702 may set an indicator to the OS to specify that the sequencer is in an unavailable state. For example, the sequencer sequester mechanism 702 may impersonate a sequencer's power or power/performance state to indicate to the OS that the sequencer has entered a special unavailable state so that the OS will deem the sequencer as too overloaded or too hot to dispatch computation or schedule instructions for the sequencer. In an embodiment, for a sequencer that implements a power saving mechanism such as Intel SpeedStep© technology, the sequencer sequester mechanism 702 may turn a particular subset of OS-visible sequencers to the special power states to indicate that the subset of sequencers are in the non-available state so that the OS will deem these subset of sequencers as overloaded and thus not dispatch computation to the subset of sequencers. In a manner transparent to the OS, the SXFR and SEMONITOR instructions may be used to schedule computations or threads for the sequestered sequencer.

In an embodiment, once a sequestered sequencer has completed executing a thread, control of the sequestered sequencer may be surrendered back to the OS. This may be achieved by a mechanism setting an indicator to indicate to the OS that the sequestered instruction sequencer is no longer in the non-available state.

In an embodiment, a privileged state of a sequestered instruction sequencer is synchronized with a counterpart privileged state of non-sequestered instruction sequencers that are still under OS control.

In general, in order to canonically support a general purpose M:N multi-threading package, i.e. one that maps M threads to N sequencers, where M>>N, the minimal building block synchronization objects that are required are critical section and event. With these synchronization objects, higher level synchronization objects like mutexes, conditional variables, and semaphores can be constructed. A critical section can be implemented via hardware lock primitives. The sequestered sequencers can inherit state from the non-sequestered sequencers such that the view of virtual memory is the same for both sequestered sequencers and non-sequestered sequencers. An event can be supported by an event-driven multi-sequencer scheduler (centralized or distributed) synthesized with the SXFR and SEMONITOR instructions. For example, a simple POSIX compliant or compatible distributed scheduler that has a global task queue protected by a critical section may be created. Each sequencer effectively runs one copy of the scheduler and attempts to contend access to the head of the task queue to grab the next ready task thread to run on the sequencer. Should one task on a sequencer be waiting for a synchronization variable such as mutex, a conditional variable, or a semaphore, the task will be de-scheduled via yield and put at the tail of the global task queue after entering the corresponding critical section.

Due to the widespread adoption of thread primitives in most modern OSes' thread libraries, it is possible that a vast number of existing threaded code built on top of these POSIX compliant or compatible thread libraries can be ported to the multi-sequencer environment. Naturally, the header files in the threads may have to be remapped and the legacy threaded code recompiled.

By using the SFXR and SEMONITOR instructions and the INIT scenario, it is possible to schedule threads of execution on OS-sequestered sequencers, without using an OS. Thus, by virtue of the techniques disclosed herein it is possible to build a multi-sequencer system with more sequencers than an OS has the ability to support and to allow user-level scheduling of threads on sequencers of the multi-sequencer system that are not supported by the OS.

Accordingly, in an embodiment, the multiple instruction sequencers with the extended instruction set can also support a single image OS on larger number of processors than natively supported by the OS. For example, an OS capable of supporting a 4-way instruction sequencer could be implemented as the OS for a hardware implementation that actually has 32-way instruction sequencer system. This allows applications to use more processors than the number of sequencers limit supported by the OS. The instruction sequencers may be asymmetric sequencers or symmetric sequencers.

Figure 11:
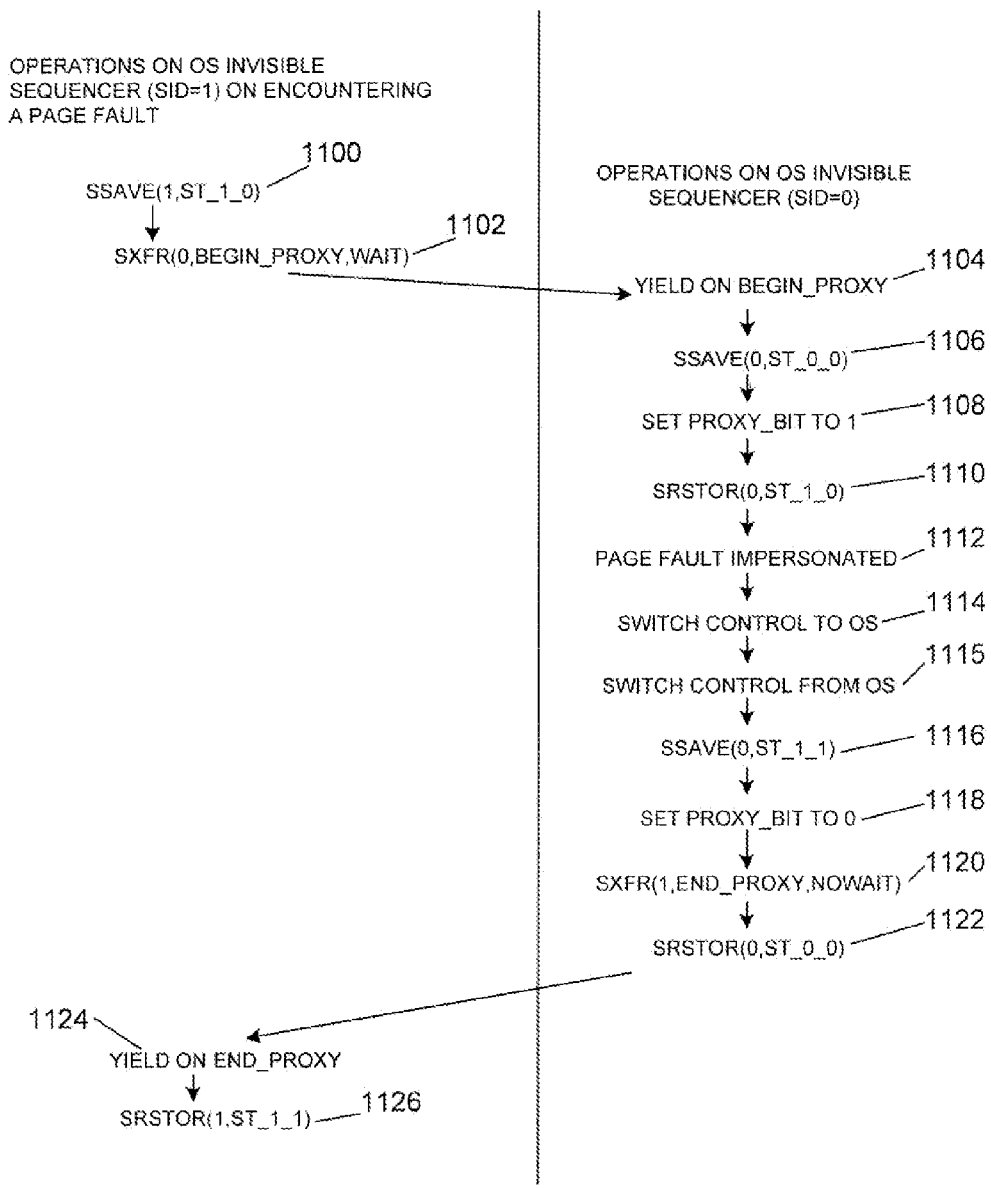
FIG. 11 shows how the SXFR and SEMONITOR instructions may be used to support proxy execution upon a page-fault handling by the OS, in accordance with one embodiment of the invention.

Now we describe one embodiment for proxy execution in a multisequencer system where some sequencers are OS-visible while others are OS-invisible. In general, when code running on the OS-invisible sequencers incurs a page fault or a system call that requires OS services, proxy execution mechanism ensures proper handling. Referring now to FIG. 11 of the drawings, there is shown a flowchart of operations performed in order to affect an OS service on an OS-sequestered sequencer with sequencer ID SID1, in response to a trigger event for proxy execution. Upon encountering the trigger event, the OS-sequestered sequencer SID1 executes the instruction SSAVE (1, ST_1_0), at 1100. The trigger event may be a predefined condition of execution in the architectural state requiring an OS service, such as a trap, a page fault, or a system call. This instruction saves the execution context of a thread whose execution generated the trigger event. For descriptive convenience, the save area for the execution context of the thread is designated (ST_1_0), to which access will not cause page fault in at least one embodiment. At 1102, a SXFR instruction is executed in order to pass the egress service scenario "BEGIN_PROXY" to an OS-visible sequencer SID0. Note that because the SXFR instruction executed at 1102 included the conditional parameter "WAIT", processing of instructions on sequencer SID1 is to be blocked pending completion of the proxy execution thread on the sequencer SID0. At 1104, the sequencer SID0 detects the signal from the sequencer SID1, and yields or "temporarily suspends", execution of the current thread. At 1106, a SSAVE instruction is executed to save the execution context or state associated with sequencer SID0. The execution context save area is labeled "ST_0_0" which does not overlap with ST_1_0. At 1108, a proxy bit is set to 1 to indicate that the sequencer SID0 is operating in proxy execution mode. At 1110, a context restore operation (SRSTOR) is executed in order to copy the state "ST_1_0", which is the execution context associated with the page fault on SID1. At 1112, the page fault is replicated or impersonated on the sequencer SID0. At 1114, a ring transition is performed to switch control to the OS. The OS services the page fault. When OS service completes, upon the privilege level switch (i.e. a ring transition) from OS to user-level and if the proxy-bit is ON, the END_PROXY scenario is incurred as an intra-sequencer yield event. In the yield event handler due to END_PROXY scenario, at 1116, a context save is performed to save an execution context "ST_{1_3}1". At 1118, the proxy bit is set to 0. At 1120, a SXFR instruction is executed to pass the service scenario "END_PROXY" to the sequencer SID1. At 1122, the sequencer SID0 restores state ST_0_0. At 1124, the sequencer SID1 yields on receiving the "END_PROXY" scenario to restore, at 1126, the context "ST_1_1" so that execution of the thread that encountered the trigger event may recommence.

In an embodiment, proxy execution may be the migration of a user level thread in response to detecting an asymmetric condition between an OS-visible instruction sequencer and an instruction sequencer under the control of an application level program when executing the user level thread.

An asymmetric condition between the instruction sequencers may include at least the following conditions such as the need for a ring/privilege level transition; which includes a page fault or system call, a lack of instruction capability by the instruction sequencer executing the user level thread (e.g., deprecation of certain instruction on one sequencer and resulting invalid op code fault), a difference in instruction execution performance between the two instruction sequencers.

States migration during proxy execution may be heavy weight or light weight. Heavy weight migration is a full register state that is saved from a transferring sequencer and restored onto the receiving sequencer. Heavy weight migration has at least one instruction from the user level thread executed on the receiving sequencer for the benefit of the transferring sequencer. Heavy weight migration allows for user level thread being executed to stay at the receiving sequencer or to return to the transferring sequencer after executing one or more instruction on behalf of the transferring instruction sequencer.

Light weight migration has many varieties—the idea being to streamline for specific situations. Light weight migration may include transferring some small amount of state so that some small task may be handled. In some light weight migration scenarios, an instruction from the user level thread is not actually executed—e.g., in the page fault situation. The instruction sequencer under the control of an application level program just transfers over the address that causes the page fault. The receiving sequencer just performs a probe load to cause the page to be loaded, and then conveys that this desired task has been accomplished back to the instruction sequencer under the control of the application level program. Thus, migration may not mean that an instruction from the migrating user level thread is actually executed.

Thus a proxy execution occurs essentially, anytime a second instruction sequencer performs an action 'on behalf of' or 'derived from' a first instruction sequencer that is executing a user level thread.

In an embodiment for the light-weight handling of page fault, one aspect of proxy execution includes the suspension of execution of instructions in a user-level thread in a first instruction sequencer that is under the control of the application level program. The transferring an address pointer from the first instruction sequencer that is under the control of the application level program to an OS-visible instruction sequencer. The loading of the contents at the address pointer with the OS-visible instruction sequencer. Finally, the resuming of execution of the first user-level thread in the instruction sequencer that is under the control of the application level program after the contents at the address pointer have been loaded.

Another aspect of proxy execution includes the transferring of control and state information from an OS sequestered instruction sequencer to an OS-visible instruction sequencer. Also, the migrating of execution of at least one instruction from the first user-level thread on the OS sequestered instruction sequencer to the OS-visible instruction sequencer so that the OS-visible instruction sequencer may trigger an operating system to perform an OS operation on behalf of the OS sequestered instruction sequencer.

Figure 12:
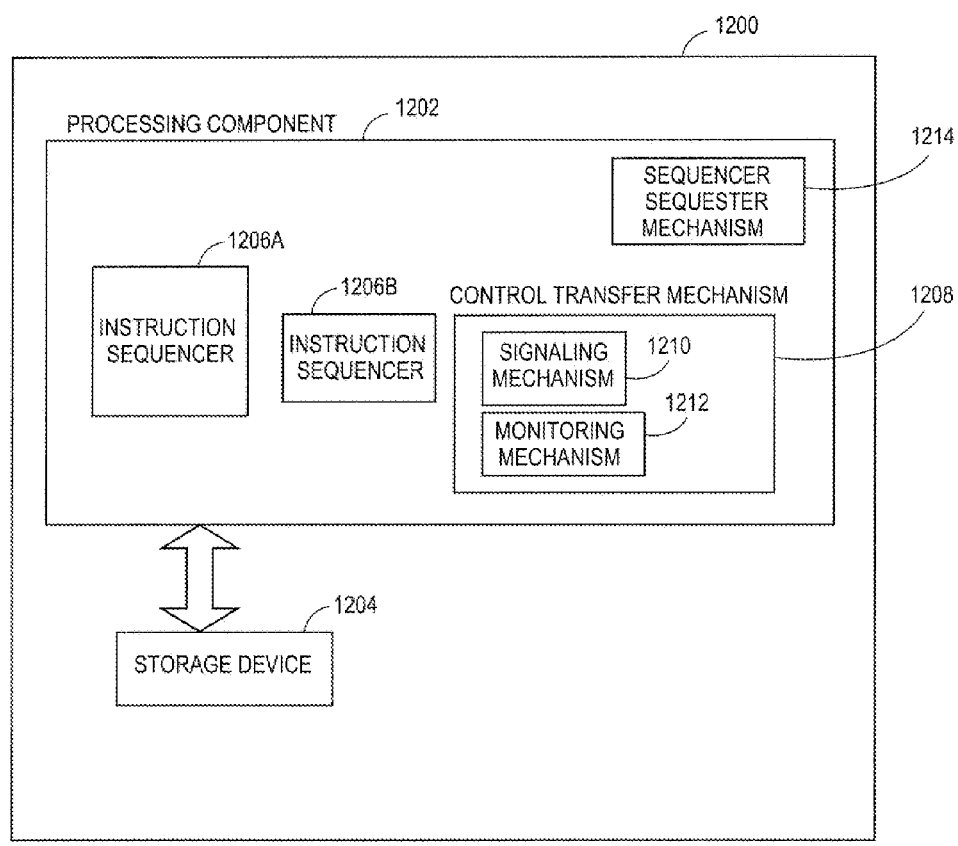
FIG. 12 shows a processing system in accordance with one embodiment of the invention.

FIG. 12 of the drawings shows a processing system 1200, in accordance with one embodiment of the invention. As will be seen, the system 1200 includes a processing component 1202 that is coupled to a storage device 1204. In an embodiment, the processing component 1202 includes a plurality of instruction sequencers, only two of which have been shown in FIG. 12 of the drawings where they are designation as 1206A, and 1206B, respectively. The processing component 1202 also includes a control transfer mechanism 1208 that includes a signaling mechanism 1210, and a monitoring mechanism 1212. The signaling mechanism 1210 may be used to send scenarios/control-transfer messages between the sequencers of the processing component 1202. As such, in an embodiment, the signaling mechanism 1210 includes logic to execute the SXFR instruction described above. The monitoring mechanism 1212 may be used to set up any of the instruction sequencers of the processing component 1202 to monitor for a signal that includes a particular control message/scenario. In an embodiment, the monitoring mechanism includes logic to decode the SEMONITOR instruction described above.

The processing component 1202 also includes a sequencer sequester mechanism 1214, as described above.

The storage device 1204 may include an operating system. In an embodiment, the operating system may perform context switching by storing a previous task's entire register state and restoring the next task's entire register state.

Within the processing component 1202, various techniques may be used to set up, for example, the sequencer 1206B to monitor for particular signals from the sequencer 1206A. In an embodiment, the sequencer 1206B may be pre-configured (i.e., without requiring any user configuration step) to monitor for signals that carry certain control messages/scenarios. Thus, in an embodiment, the sequencer 1206B may be pre-configured to monitor for a signal that carries the INIT scenario. It will appreciated, that a user-level instruction such as SXFR may be used to trigger execution of initialization code on the sequencer 1206B. The initialization code itself may comprise a SEMONITOR instruction that may be used set up the sequencer 1206B to monitor for particular signals (scenarios) from the sequencer 1206A.

In another embodiment, the sequencer-aware SEMONITOR instruction may be executed on the sequencer 1206A to cause the sequencer 1206B to monitor for particular signals/scenarios from the sequencer 1206A. In another embodiment, a pointer to a memory location that store bootstrap/initialization code may be saved as part of a context for the sequencer 1206A using the SSAVE instruction described above. For this embodiment, it is possible to execute a SRSTOR instruction on the sequencer 1206B to restore the context/state for the sequencer 1206A so that the bootstrap/initialization code may be executed. The bootstrap/initialization code by itself contains at least one SEMONITOR instruction to set up the sequencer 1206B to monitor for particular signals/scenarios from the sequencer 1206A.

Figure 13:
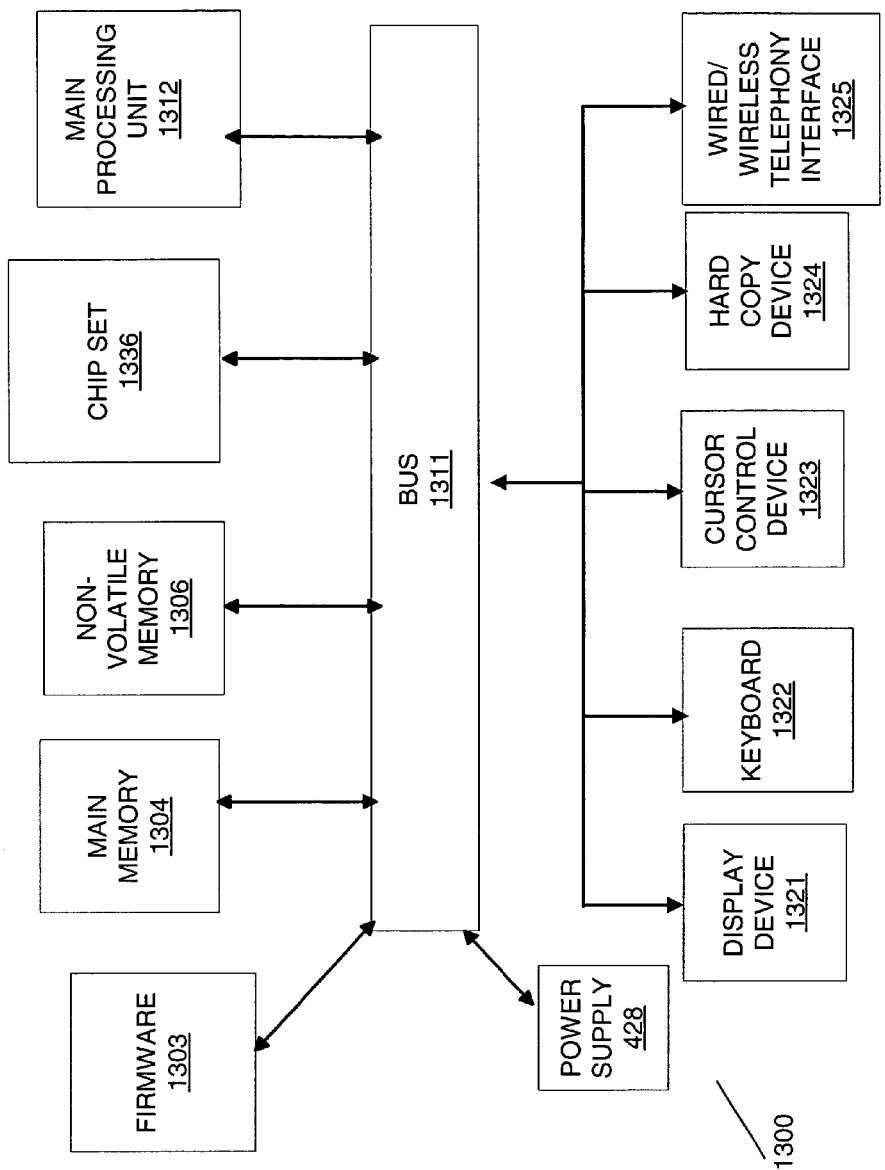
FIG. 13 illustrates a block diagram of an example computer system that may use an embodiment of a processor component, such as a Central Processing Unit (CPU) or chipset, that includes one or more instruction sequencers configured to execute one or more user-level threads that contain sequencer aware user-level instructions.

FIG. 13 illustrates a block diagram of an example computer system that may use an embodiment of a processor component, such as a CPU or chipset, that includes one or more instruction sequencers configured to execute one or more user-level threads that contain sequencer aware user-level instructions. In one embodiment, computer system 1300 comprises a communication mechanism or bus 1311 for communicating information, and an integrated circuit component such as a main processing unit 1312 coupled with bus 1311 for processing information. One or more of the components or devices in the computer system 1300 such as the main processing unit 1312 or a chip set 1336 may use an embodiment of the instruction sequencers configured to execute one or more user-level threads. The main processing unit 1312 may consist of one or more processor cores working together as a unit.

Computer system 1300 further comprises a random access memory (RAM) or other dynamic storage device 1304 (referred to as main memory) coupled to bus 1311 for storing information and instructions to be executed by main processing unit 1312. Main memory 1304 also may be used for storing temporary variables or other intermediate information during execution of instructions by main processing unit 1312.

Firmware 1303 may be a combination of software and hardware, such as Electronically Programmable Read-Only Memory (EPROM) that has the operations for the routine recorded on the EPROM. The firmware 1303 may embed foundation code, basic input/output system code (BIOS), or other similar code. The firmware 1303 may make it possible for the computer system 1300 to boot itself.

Computer system 1300 also comprises a read-only memory (ROM) and/or other static storage device 1306 coupled to bus 1311 for storing static information and instructions for main processing unit 1312. The static storage device 1306 may store OS level and application level software.

Computer system 1300 may further be coupled to a display device 1321, such as a cathode ray tube (CRT) or liquid crystal display (LCD), coupled to bus 1311 for displaying information to a computer user. A chipset may interface with the display device 1321.

An alphanumeric input device (keyboard) 1322, including alphanumeric and other keys, may also be coupled to bus 1311 for communicating information and command selections to main processing unit 1312. An additional user input device is cursor control device 1323, such as a mouse, trackball, trackpad, stylus, or cursor direction keys, coupled to bus 1311 for communicating direction information and command selections to main processing unit 1312, and for controlling cursor movement on a display device 1321. A chipset may interface with the input output devices.

Another device that may be coupled to bus 1311 is a hard copy device 1324, which may be used for printing instructions, data, or other information on a medium such as paper, film, or similar types of media. Furthermore, a sound recording and playback device, such as a speaker and/or microphone (not shown) may optionally be coupled to bus 1311 for audio interfacing with computer system 1300. Another device that may be coupled to bus 1311 is a wired/wireless communication capability 1325.

In one embodiment, the software used to facilitate the routine can be embedded onto a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

During development, a design may go through various stages, from creation to simulation to fabrication. Data representing a design may represent the design in a number of manners. First, as is useful in simulations, the hardware may be represented using a hardware description language or functional description language. Additionally, a circuit-level model with logic/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. Any optical or electrical wave modulated or otherwise generated to transform such information, a memory, or a magnetic or optical storage such as a disc may be the machine-readable medium. Any of these mediums may "carry" or "indicate" the design or software information. When an electrical carrier wave indicating or carrying the code or design is transmitted, to the extent that copying, buffering or retransmission of the electrical signal is performed, a new copy is made. Thus, a communication provider or a network provider may make copies of an article (carrier wave) embodying techniques of the present invention.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

We claim:

1. A processor, comprising:
    an instruction cache to store instructions;
    one or more processing resources that are shared among multiple threads;
    a plurality of processing cores, wherein each processing core, of the plurality of processing cores, is to support simultaneous multithreading and comprises:
        logically independent next-instruction-pointer and fetch logic to fetch one or more threads of instructions;
        an instruction decode logic to decode the one or more fetched threads of instructions;
        a first logic to:
            cause the plurality of processing cores to appear to a user-level program as multiple logical processors by masking the asymmetry between processing cores, and identify a first set of logical processors of the multiple logical processors to execute each fetched thread without considering physical configuration of the plurality of processing cores; and
        a second logic to, when a thread of instructions is scheduled to be executed on the first set of logical processors and requires use of a specific resource, transfer the processing of the entire thread of instructions from the first set of the logical processors to a second set of the logical processors responsive to receiving a control transfer instruction specifying a logical processor identifier, wherein the control transfer instruction is used to send a signal from the first set of logical processors to be received by the second set of logical processors, and wherein the logical processor specified by the control transfer instruction processes the thread of instructions.

2. The processor of claim 1, wherein each core is a part of a sequencer.

3. The processor of claim 1, wherein at least one thread of instructions is visible to an operating system.

4. The processor of claim 1, wherein at least one thread of instructions is operating system sequestered.

5. The processor of claim 1, wherein the control transfer instruction is user-level accessible.

6. The processor of claim 1, wherein the control transfer instruction includes an opcode, an operand for a sequencer identifier for a destination logical processor, and an operand for one of a plurality of architecturally defined scenarios.

7. The processor of claim 6, wherein the one of the plurality of architecturally defined scenario is a begin proxy scenario.

8. The processor of claim 1, wherein the processing core to save a context of an executing thread in response to the control transfer instruction.

9. The processor of claim 8, wherein the context is to be saved in by an execution of a context save instruction.

10. A system comprising:
a memory to store an operating system;
a processor coupled to the memory, the processor comprising:
an instruction cache to store instructions;
one or more processing resources that are shared among multiple threads;
a plurality of processing cores, wherein each processing core, of the plurality of processing cores, is to support simultaneous multithreading and comprises:
logically independent next-instruction-pointer and fetch logic to fetch one or more threads of instructions;
an instruction decode logic to decode the one or more fetched threads of instructions;
a first logic to:
cause the plurality of processing cores to appear to a user-level program as multiple logical processors by masking the asymmetry between processing cores, and
identify a first set of logical processors of the multiple logical processors to execute each fetched thread without considering physical configuration of the plurality of processing cores; and
a second logic to, when a thread of instructions is schedule to be executed on the first set of logical processors and requires use of a specific resource, transfer the processing of the entire thread of instructions from the first set of the logical processors to a second set of the logical processors responsive to receiving a control transfer instruction specifying a logical processor identifier, wherein the control transfer instruction is used to send a signal from the first set of logical processors to be received by the second set of logical processors, and wherein the logical processor specified by the control transfer instruction processes the thread of instructions.

11. The system of claim 10, wherein each core is a part of a sequencer.

12. The system of claim 10, wherein at least one thread of instructions is visible to the operating system.

13. The system of claim 10, wherein at least one thread of instructions is operating system sequestered.

14. The system of claim 10, wherein the control transfer instruction is user-level accessible.

15. The system of claim 10, wherein the control transfer instruction includes an opcode, an operand for a sequencer identifier for a destination logical processor, and an operand for one of a plurality of architecturally defined scenarios.

16. The system of claim 15, wherein the one of the plurality of architecturally defined scenario is a begin proxy scenario.

17. The system of claim 10, wherein the processing core to save a context of an executing thread in response to the control transfer instruction.

18. The system of claim 17, wherein the context is to be saved in by an execution of a context save instruction.

* * * * *